(12) United States Patent
Heanssler et al.

(10) Patent No.: US 11,470,951 B1
(45) Date of Patent: Oct. 18, 2022

(54) TOOL HOLDER

(71) Applicant: Sherrill, Inc., Greensboro, NC (US)

(72) Inventors: Micah Heanssler, Windham, ME (US); Nicholas Bonner, Arlington, MA (US)

(73) Assignee: Sherrill, Inc., Greensboro, NC (US)

( * ) Notice: Subject to any disclaimer, the term of this patent is extended or adjusted under 35 U.S.C. 154(b) by 0 days.

(21) Appl. No.: 17/725,738

(22) Filed: Apr. 21, 2022

(51) Int. Cl.
    *A45F 5/02* (2006.01)
(52) U.S. Cl.
    CPC ...... *A45F 5/021* (2013.01); *A45F 2200/0575* (2013.01)
(58) Field of Classification Search
    CPC .. A45F 5/021; A45F 2200/0575; F16B 45/02; F16B 45/023; F16B 45/024; Y10T 24/45325; Y10T 24/4534; Y10T 24/45366
    See application file for complete search history.

(56) References Cited

U.S. PATENT DOCUMENTS

| | | | | |
|---|---|---|---|---|
| 4,118,840 A | * | 10/1978 | Fengels | F16B 45/02 24/599.7 |
| 6,588,076 B1 | * | 7/2003 | Choate | F16B 45/02 24/600.2 |
| 6,715,898 B1 | * | 4/2004 | Huang | F21V 31/00 362/396 |
| 7,946,006 B2 | * | 5/2011 | Thompson | F16B 45/02 24/601.5 |
| 8,480,690 B2 | * | 7/2013 | Vijayanagar | A61B 50/20 24/598.2 |
| 9,638,237 B2 | * | 5/2017 | Yeh | F16B 45/02 |
| 10,793,077 B2 | | 10/2020 | Villacres Mesias et al. | |
| 10,948,006 B2 | | 3/2021 | Mojica | |
| 2003/0015560 A1 | * | 1/2003 | Grover | B25H 3/006 224/904 |
| 2008/0022497 A1 | | 1/2008 | Thompson | |
| 2010/0325848 A1 | * | 12/2010 | Liang | F16B 45/02 24/598.2 |
| 2014/0373320 A1 | | 12/2014 | Nemec | |
| 2021/0381542 A1 | * | 12/2021 | Peterson | A63B 29/02 |

FOREIGN PATENT DOCUMENTS

GB 2581804 A 9/2020

* cited by examiner

*Primary Examiner* — Brian D Nash
(74) *Attorney, Agent, or Firm* — Altman & Martin; Steven K Martin

(57) ABSTRACT

A tool holder with a J-shaped body. A gate includes an arm that is pivotally attached to a finger at the top of the body. The gate pivots between a closed position where the gate spans the opening between the two free ends of the body, an inside position where the gate is pivoted into the inside the body, and an outside position where gate is pivoted to outside the body. A biasing mechanism biases the gate to the closed position. An optional gate lock prevents the gate from opening when engaged. A barrel either rotates or slides, depending in the configuration, on the arm between an unlocked position where the gate can move between the inside, closed, and outside positions, and a locked position where the gate is retained in the closed position. An attachment secures the tool holder to flat webbing.

20 Claims, 26 Drawing Sheets

TOOL HOLDER

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to tool holders, more particularly, to hooks that mount to harnesses and belts to carry tools securely.

2. Description of the Related Art

Climbers who want the ability to carry climbing equipment, such as spare carabiners, lanyards, slings, and rope, use tool holders attached to their climbing harnesses and/or belts. The tool holder provides convenient access to working equipment. They can be designed to be attached to various locations on the harness/belt based on the user's preference. They are typically attached by specific hardware, such as screws with a matching receiving plate, to provide a secure attachment.

BRIEF SUMMARY OF THE INVENTION

The present invention is a tool holder with a body, gate, and attachment. The body has a J shape with a hook and finger. The gap between the free end of the hook and the finger is an opening into the interior of the body. The body has an optional attachment ring.

The gate has an arm. A radial notch formed by tines in a pivot end of the arm straddles the finger. A pivot pin extends through aligned holes in the tines and finger and secured. The gate pivots on the pivot pin between a closed position where the gate spans the opening, an inside position where the gate is pivoted into the interior, and an outside position where gate is pivoted outside of the body. An optional interlock between the free end of the arm and the hook free end prevents side-to-side motion of the arm when in the closed position. A gate biasing mechanism biases the gate to the closed position.

When a device is being put on the tool holder, the device is pushed against the gate so that the gate opens to the inside position. When the device is in the interior, the gate biasing mechanism forces the gate back to the closed position. When a device is then removed from the tool holder, the device is pulled against the gate so that the gate opens to the outside position. When the device is outside of the interior, the gate biasing mechanism forces the gate back to the closed position.

An optional gate lock prevents the gate from opening when engaged. In one configuration, the gate lock includes a barrel that fits over and rotates about the arm. A pin secures that barrel to the arm and operates as a rotational stop for the barrel as the barrel rotates between an unlocked position and a locked position. In the unlocked position, a lateral slot in the end of the barrel aligns with a lateral slot in the end of the arm, permitting a tab extending from the hook free end to pass through. The gate is free to pivot between the inside, outside, and closed positions. In the locked position, the barrel slot and arm slot are not aligned, capturing the tab, and preventing the gate from pivoting from the closed position. A retaining mechanism maintains the barrel in the unlocked or locked position until rotated manually.

Another configuration of the gate lock includes a barrel with an axial bore that fits over a narrow portion of the arm so as to slide up and down the narrow portion. A pin secures the barrel to the arm.

The barrel slides between an unlocked position, where the barrel bore does not extend over the hook tab and the gate is free to pivot between the closed, inside, and the outside position, and a locked position, where the barrel bore extends over the hook tab and the gate is retained in the closed position. A retaining mechanism retains the barrel in the unlocked or locked position until moved manually.

The attachment secures the tool holder to the flat webbing of a harness, belt, or the like. In several configurations, the webbing is sandwiched between the flat surface on the back of the body and a flat surface on a plate that is secured to the body. Other configurations of the attachment include different clips. Optionally, textured surface(s) help retain the tool holder in place on the webbing.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 25 is an exploded view of another configuration of the tool holder attachment to a webbing;

DETAILED DESCRIPTION OF THE INVENTION

Figure 1:
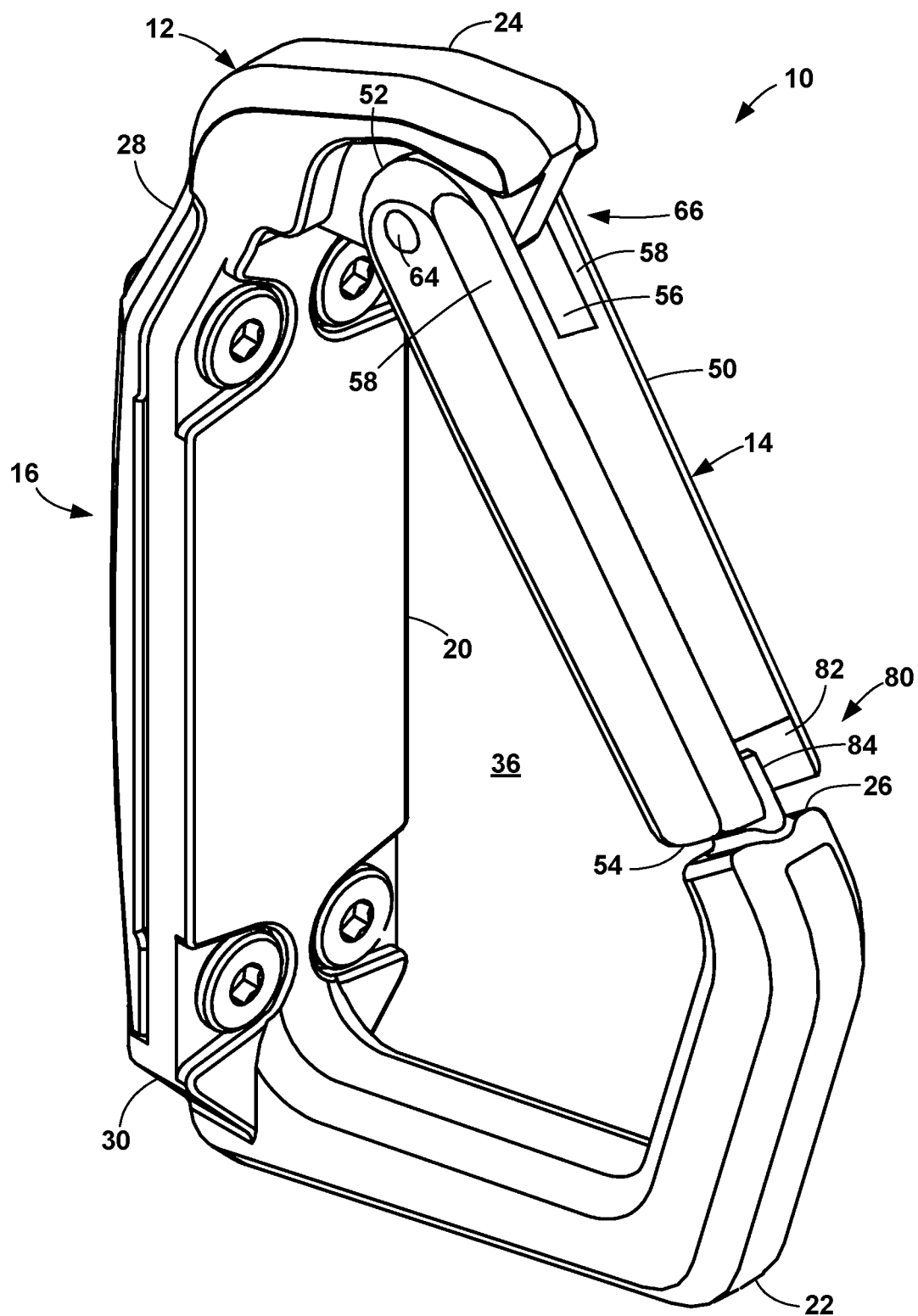
FIG. 1 is perspective view of the tool holder of the present invention.
Figure 2:
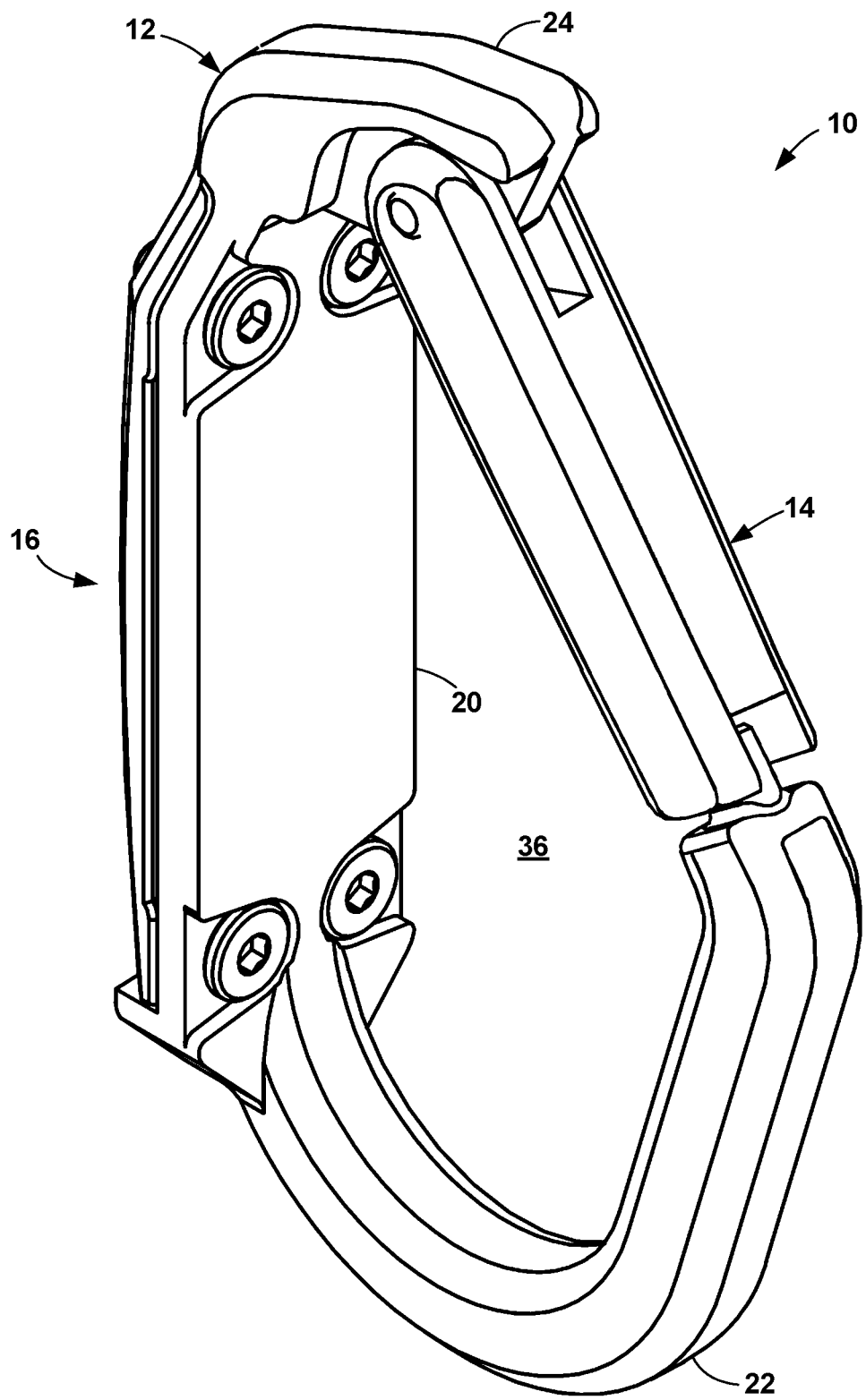
FIG. 2 is a perspective view of the tool holder with a rounded hook.

The present invention is a tool holder 10 with a body 12, a gate 14, and an attachment 16. The body 12 has a J shape with a vertical back 20, a finger 24 extending generally perpendicularly from the upper end 28 of the back 20, and a hook 22 with a free end 26 extending from the lower end 30 of the back 20 from the same side as the finger 24. The hook 22 can be somewhat squared off, as in FIG. 1, rounded, as in FIG. 2, or any other desired shape.

The gap between the hook free end 26 and the finger 24 is an opening 34 into the interior 36 of the body 12 defined by the back 20, hook 22, and finger 24.

Figure 3:
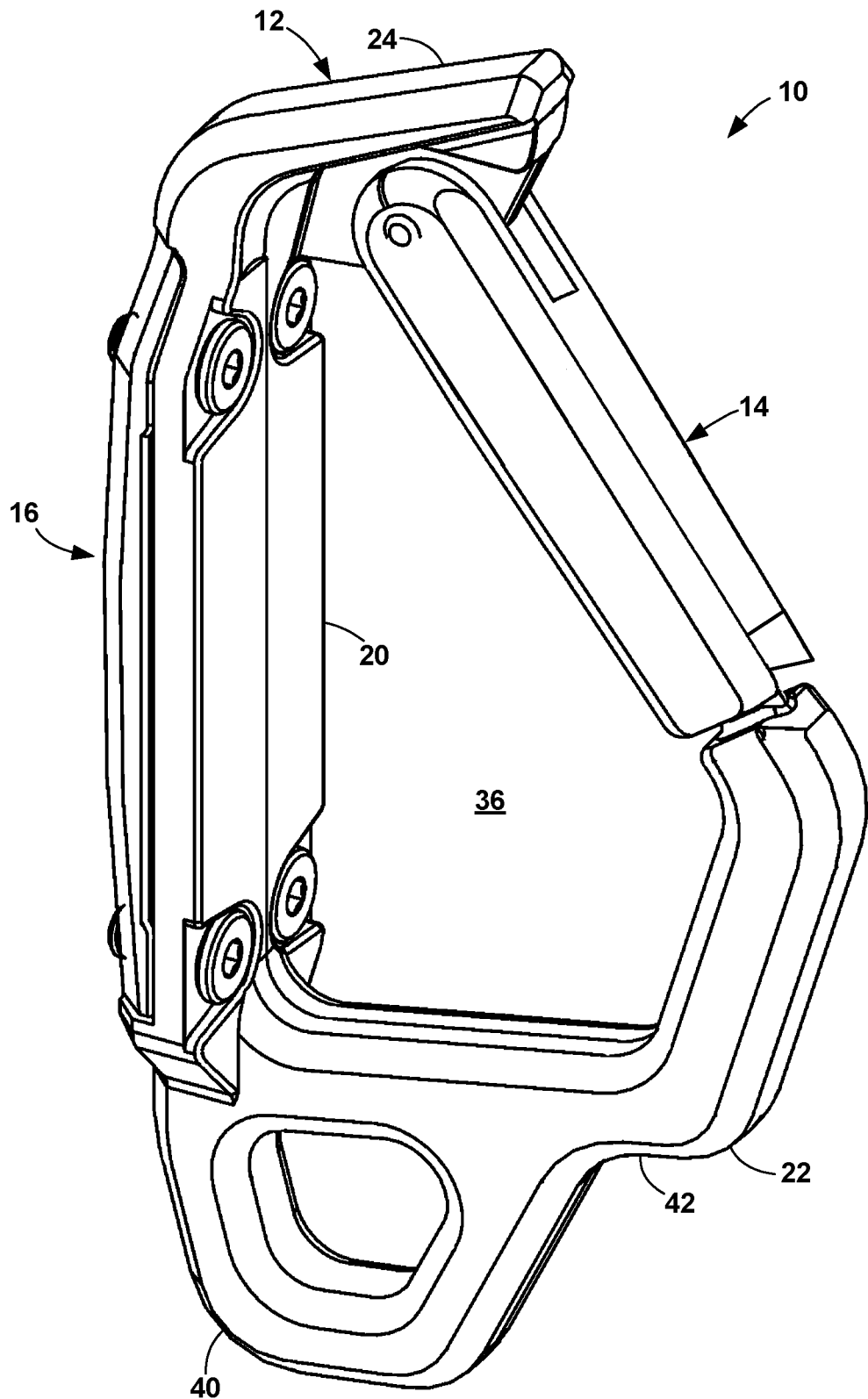
FIG. 3 is a perspective view of the tool holder with a bottom loop.
Figure 4:
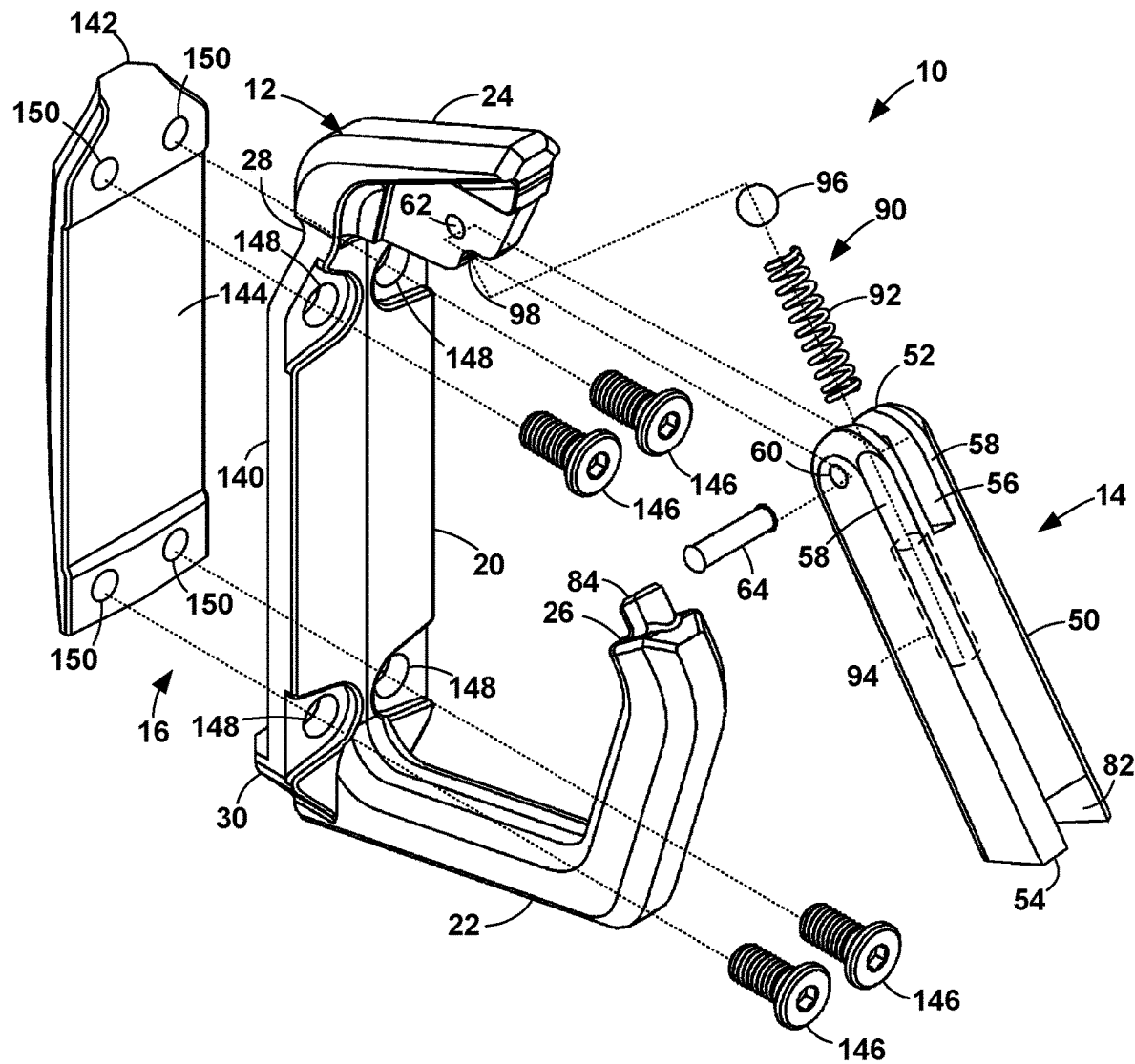
FIG. 4 is an exploded view of the tool holder.

Optionally, as shown in FIG. 3, the body has an attachment ring 40 for attaching items extending from the bottom 42 of the hook 22.

The gate 14 has an elongated arm 50 with a pivot end 52 and a free end 54. A radial notch 56 formed by tines 58 in the pivot end 52 straddles the finger 24, as at 66. Lateral coaxial through holes 60 in the tines 58 are aligned with a through hole 62 in the finger 24. A pivot pin 64 extends through the holes 60, 62 and is secured. In the illustrated configuration, the pivot pin 64 is secured by being press fit into either the tine holes 60 or the finger hole 62. In the former case, the pin 64 pivots in the finger hole 62, and in the latter case, the tine holes 60 pivot on the pin 64. Alternatively, the pin 64 is the body of a rivet that is installed through the holes 60, 62, or the pin 64 is the body of a screw that extends through the holes 60, 62. Any mechanism that provides a pin 64 on which the gate 14 can pivot is contemplated by the present invention.

Figure 5:
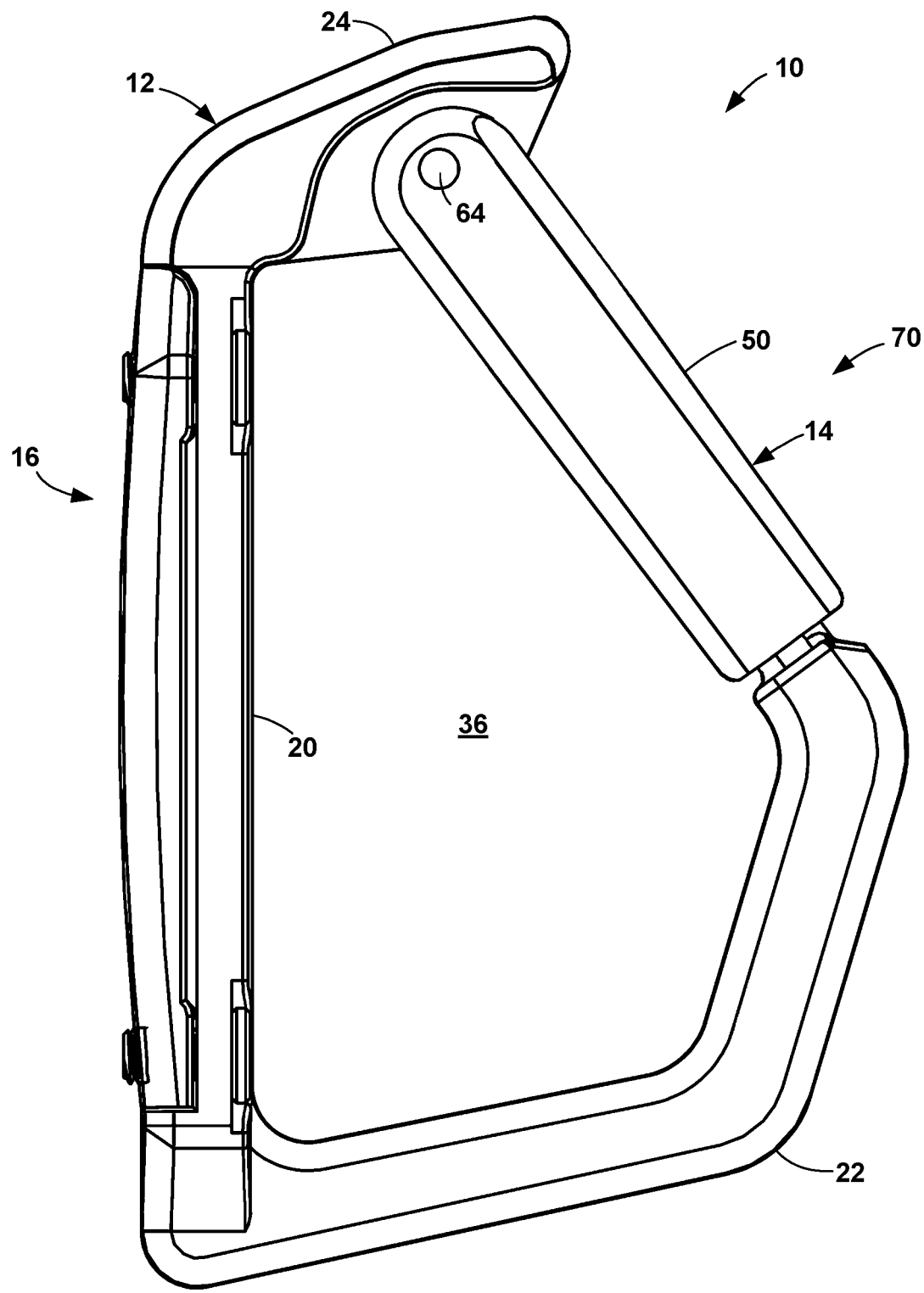
FIG. 5 is a side view of the tool holder in the closed position.
Figure 6:
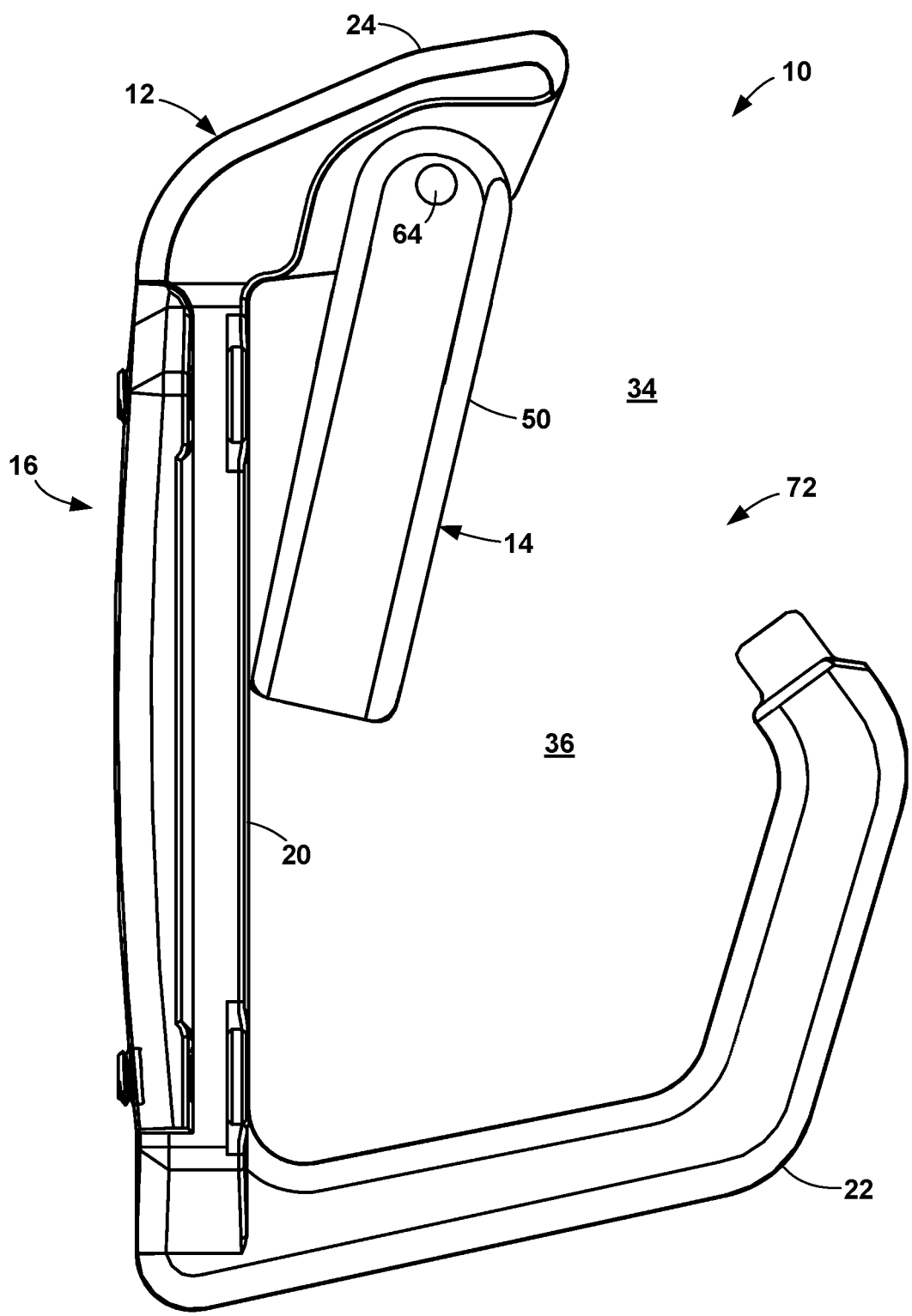
FIG. 6 is a side view of the tool holder in the inner position.
Figure 7:
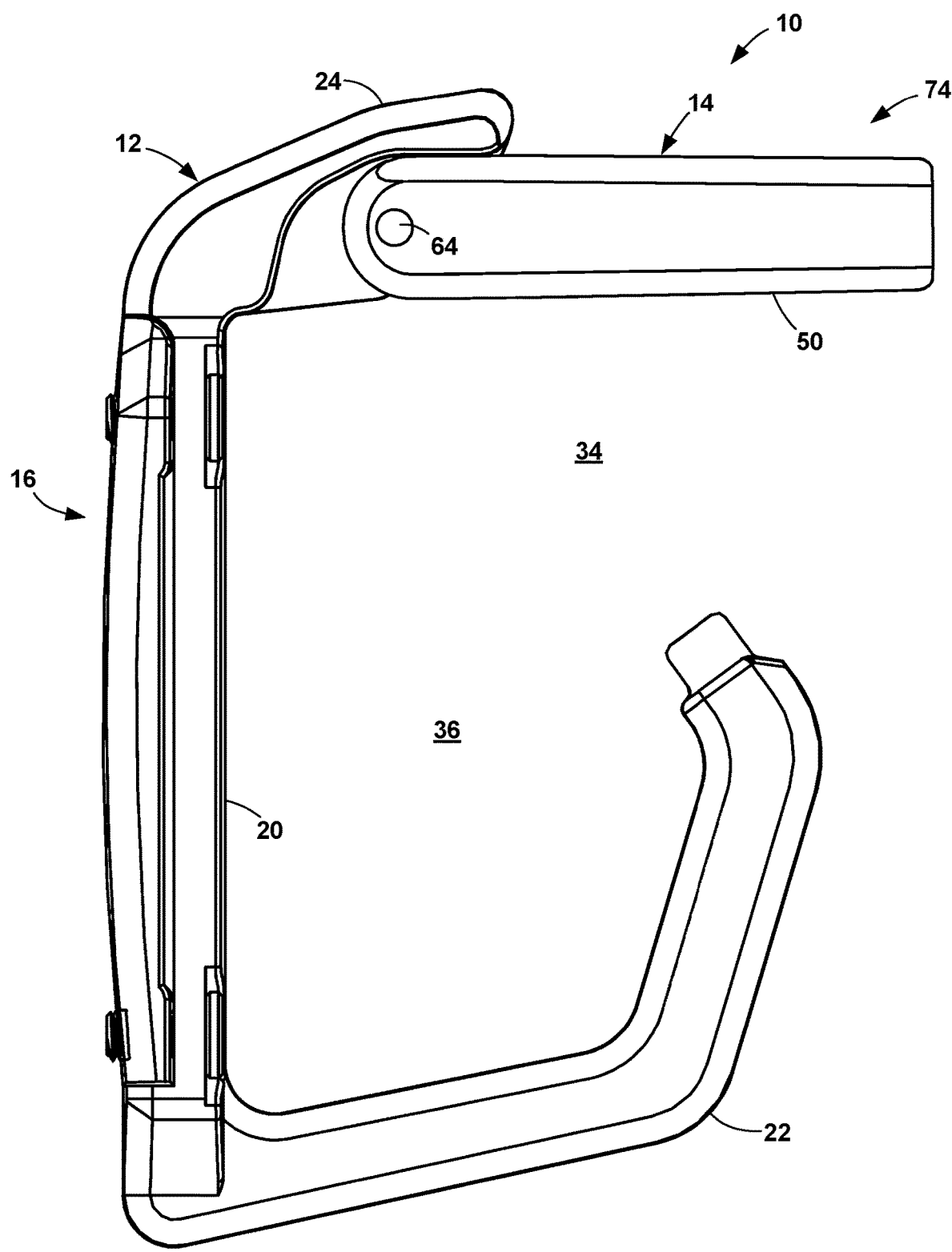
FIG. 7 is a side view of the tool holder in the outer position.

The gate 14 pivots on the pivot pin 64 between a closed position 70, an inside position 72, and an outside position 74. In the closed position 70, shown in FIG. 5, the gate 14 spans the opening 34 between the finger 24 and the hook free end 26, preventing access to the interior 36. In the inside position 72, shown in FIG. 6, the gate 14 is pivoted so that the arm free end 54 is within the interior 36, providing access to the interior 36. In the outside position 74, shown in FIG. 7, the gate 14 is pivoted so that the arm free end 54 is outside of the interior 36, providing access to the interior 36.

When the gate 14 is in the closed position 70, an optional interlock 80 between the arm free end 54 and the hook free end 26 prevents side-to-side motion of the arm free end 54 relative to the hook free end 26. There are a number of methods known in the art to form an interlock 80. In the present design, a radial slot 82 in the arm free end 54 fits over a tab 84 extending from the hook free end 26 into the opening 34, as in FIG. 1. The slot 82 extends in the direction that the gate 14 pivots so that the tab 84 slides through the slot 82 when the gate 14 pivots to the inside position 72 or the outside position 74.

Figure 8:
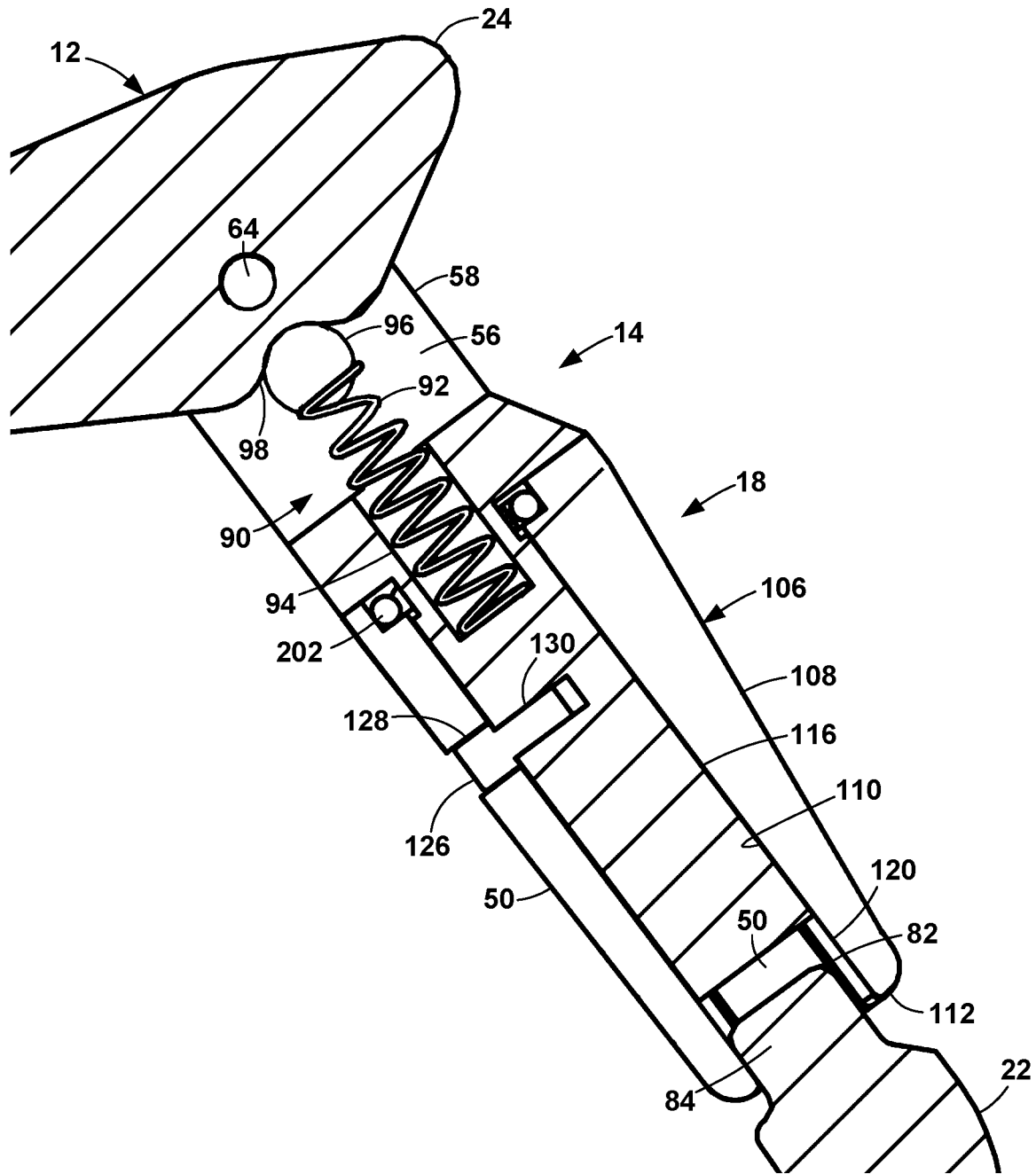
FIG. 8 is a cross-sectional view of the gate biasing mechanism with the gate in the closed position and the gate lock in the locked position.
Figure 9:
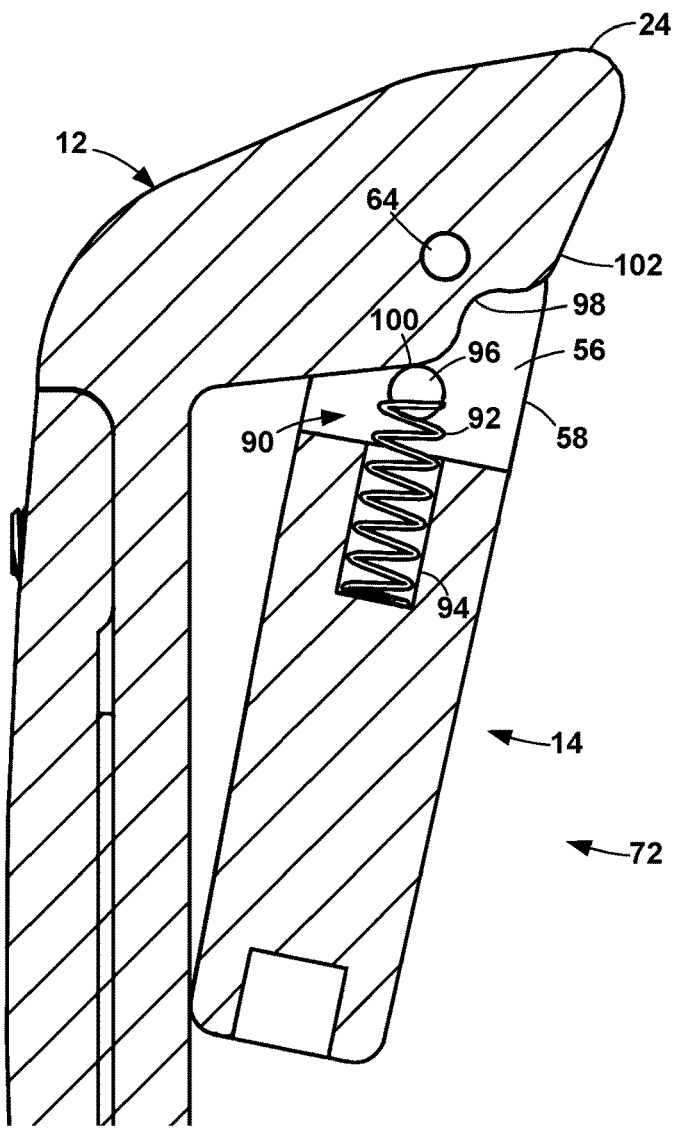
FIG. 9 is a cross-sectional view of the gate biasing mechanism with the gate in the interior position.
Figure 10:
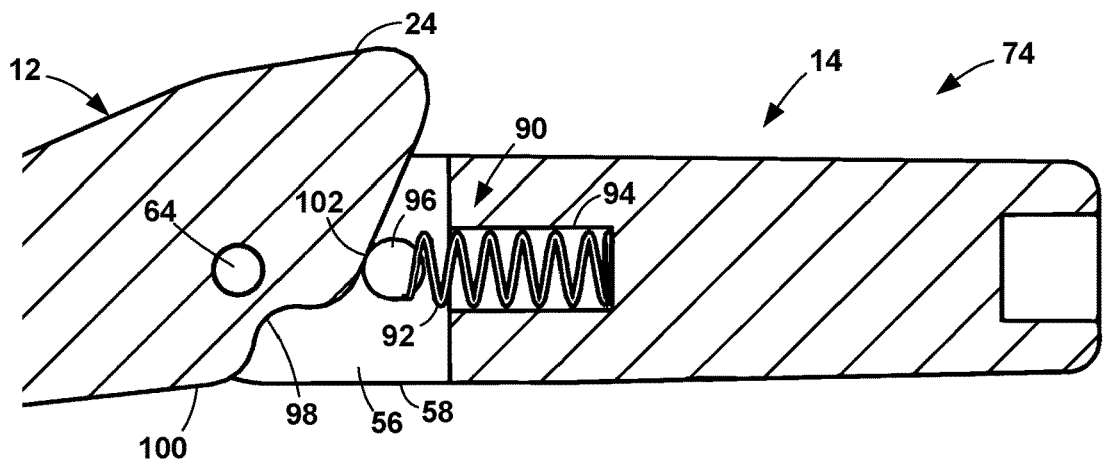
FIG. 10 is a cross-sectional view of the gate biasing mechanism with the gate in the exterior position.
Figure 11:
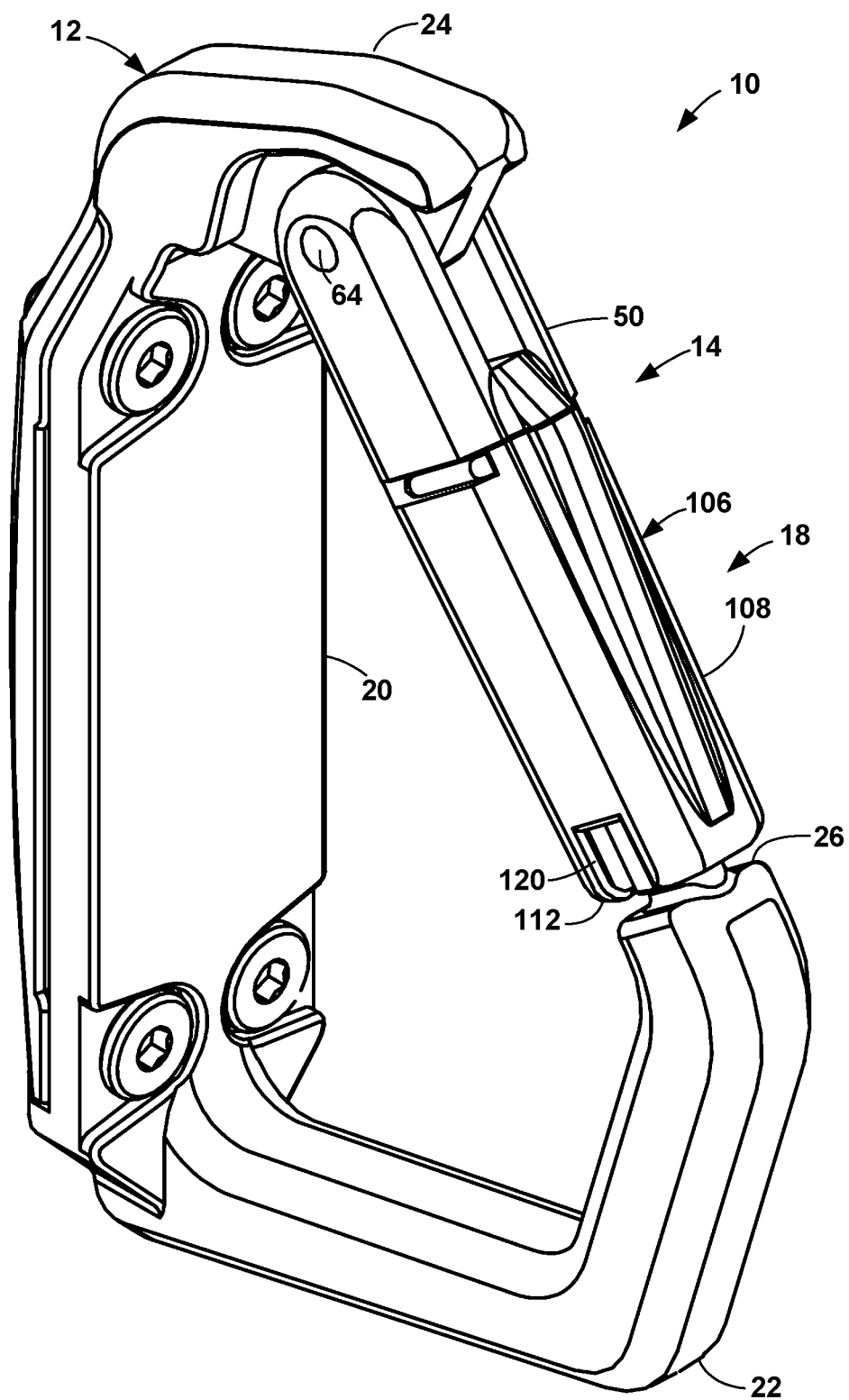
FIG. 11 is perspective view of the tool holder with the optional gate lock in the locked position.
Figure 12:
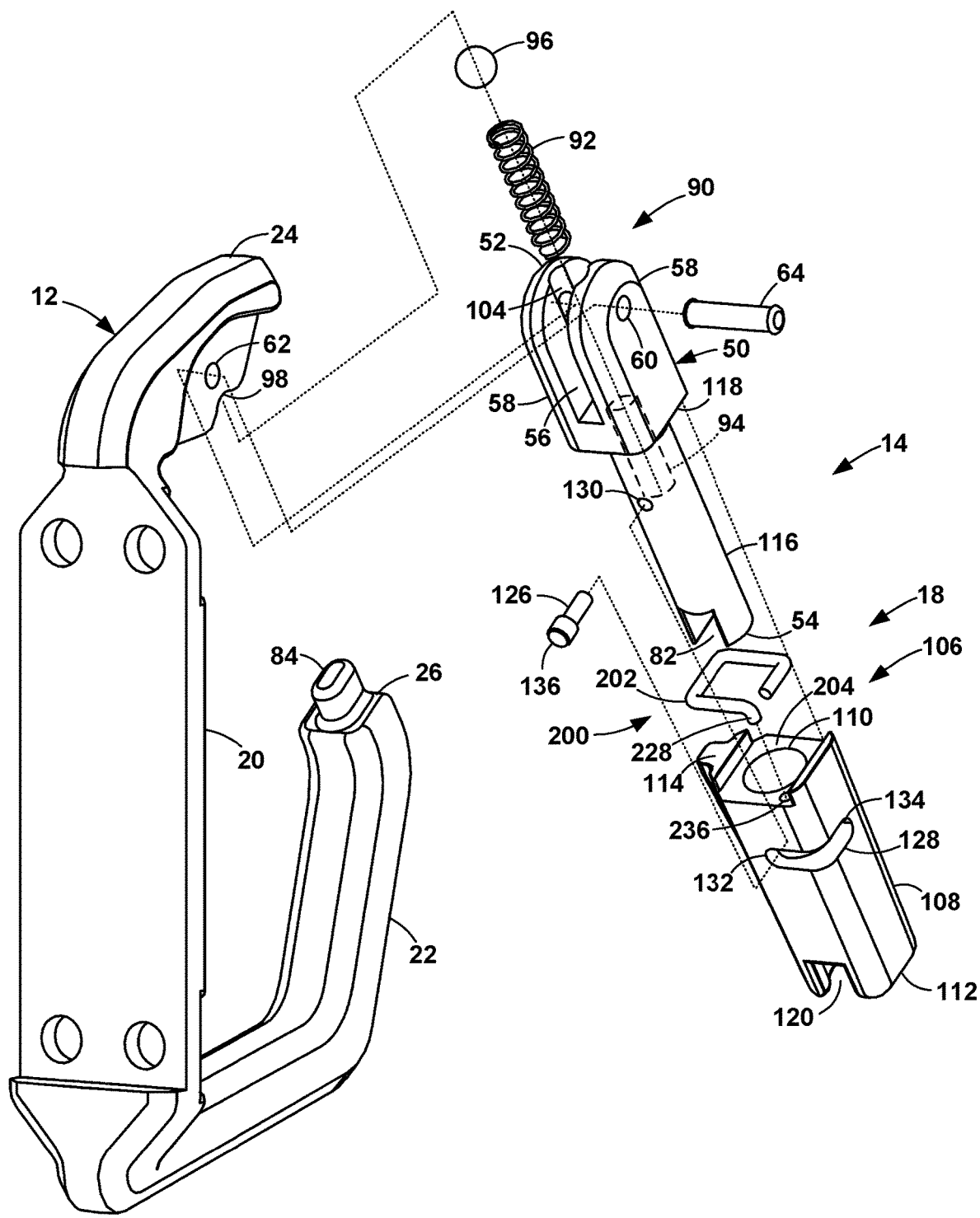
FIG. 12 is an exploded view of the tool holder with one configuration of the optional gate lock.
Figure 13:
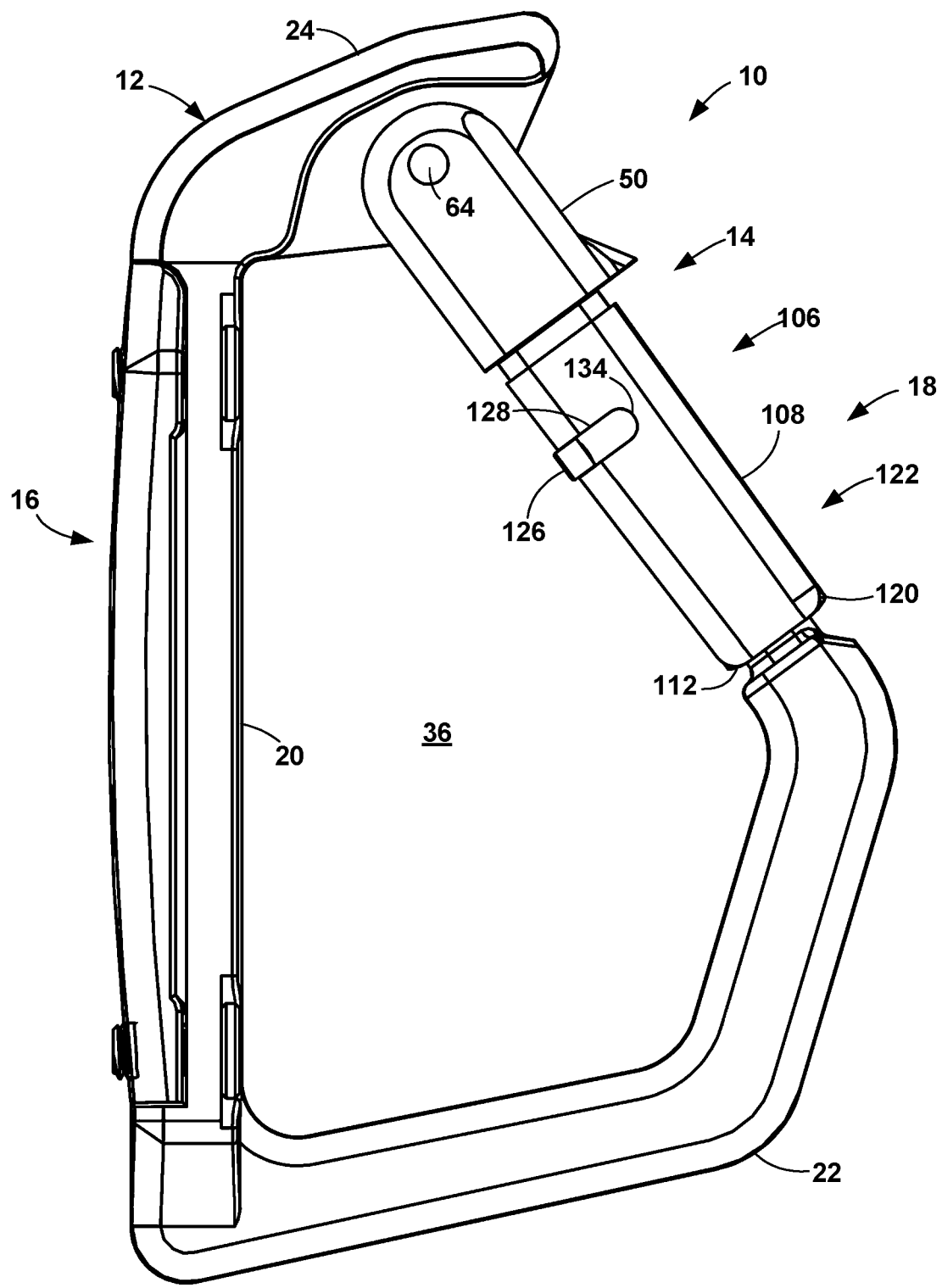
FIG. 13 is a side view of the tool holder in the closed position with the optional gate lock of FIG. 12 in the unlocked position.
Figure 14:
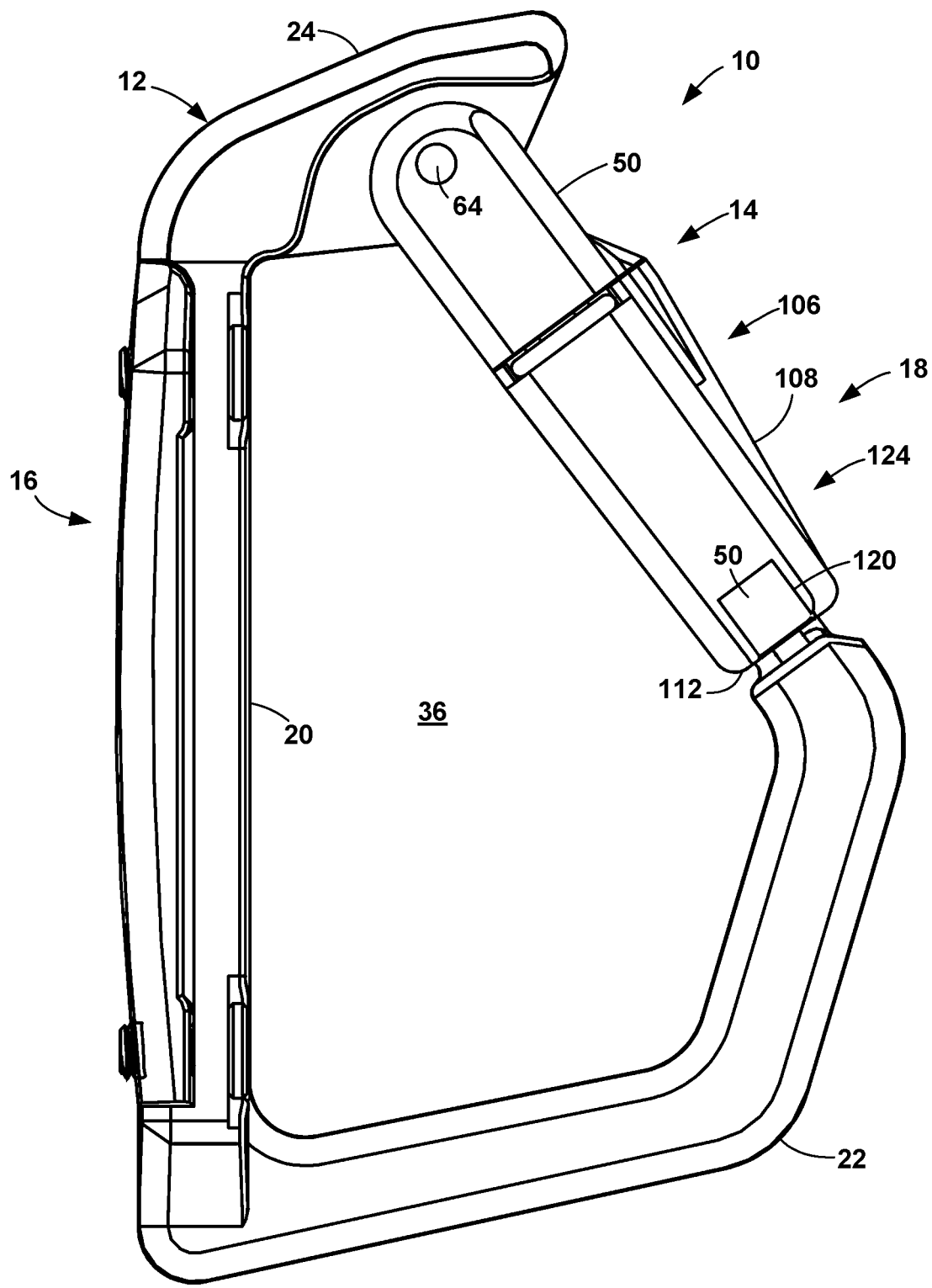
FIG. 14 is a side view of the tool holder in the closed position with the optional gate lock of FIG. 12 in the locked position.

A gate biasing mechanism 90 biases the gate 14 to the closed position 70. In the present design, shown in FIGS. 8-10, a coil spring 92 fits in a closed bore 94 in the arm 50. A steel ball 96 rests on the end of the spring 92 and the spring 92 pushes the ball 96 into a finger notch 98 in the finger 24. When the gate 14 is pushed opened to the inside position 72, the steel ball 96 rolls out of the finger notch 98 to the inside surface 100 of the finger 24, thereby compressing the spring 92. When the pushing force is removed, the spring 92 pushes the ball 96 back into the finger notch 98, whereby the gate 14 returns to the closed position 70. When the gate 14 is opened to the outside position 74, the steel ball 96 rolls out of the finger notch 98 to the outside surface 102 of the finger 24, thereby compressing the spring 92. When the pushing force is removed, the spring 92 pushes the ball 96 back into the finger notch 98, whereby the gate 14 returns to the closed position 70. Optional rounded grooves 104 in the tines 58 keep the spring 92 and ball 96 in place.

When a device, such as a carabiner, is being put on the tool holder 10, the device is typically pushed against the gate 14 so that the gate 14 opens to the inside position 72. When the device is in the interior 36 and hung on the hook 22, the gate biasing mechanism 90 forces the gate 14 back to the closed position 70 as described above.

When a device is then removed from the tool holder 10, the device is typically pulled against the gate 14 so that the gate 14 opens to the outside position 74. When the device is outside of the interior 36, the gate biasing mechanism 90 forces the gate 14 back to the closed position 70 as described above.

An optional gate lock 18, shown in FIGS. 8 and 11-21, prevents the gate 14 from opening when engaged and can be incorporated into the tool holder 10 when the interlock 80 is implemented. The configuration 106 of the gate lock 18 of FIGS. 8 and 11-18 includes a barrel 108 with an axial bore 110, a retainer end 116, a free end 112, and a radial slot 120 in the free end 112. The axial bore 110 fits over a narrow portion 116 of the arm 50 and is mounted to rotate about the narrow portion 116. The barrel 108 is positioned on the narrow portion 116 so that the retainer end 116 abuts a radial wall 118 formed by the change in diameter of the arm 50, and the barrel free end 112 is generally aligned with the arm free end 54, that is, the barrel free end 112 is within 5 mm of the arm free end 54.

A pin 126 extends through an elongated, circumferential slot 128 in the barrel 108 and is secured in a hole 130 in the arm 50. The pin 126 can be secured by being press-fit into the hole 130, by threads turned into the hole 130, by adhesive, by magnet, or any other adequate means. Optionally, the pin 126 has a head 136 for a tighter fit.

The pin 126 provides two functions. The first is to secure the barrel 108 to the arm 50 so that the barrel 108 retained on the arm 50 but still be able to rotate about the arm 50. The second function is to provide rotational stops, as described below.

The barrel 108 rotates between an unlocked position 122 and a locked position 124. In the unlocked position 122, the pin 126 is against an unlock stop 132 at one end of the slot 128 and the barrel slot 120 is aligned with the arm slot 82. In the locked position 124, the pin 126 is against a lock stop 134 at the other end of the slot 128 and the barrel slot 120 is not aligned with the arm slot 82. Typically, the length of the slot 128, and hence to location of the unlock stop 132 and lock stop 134, is such that the unlocked position 122 and the locked position 124 are about 90° of rotation apart. This means that the slot 128 extends about 90° around the wall of the barrel 108. When in the unlocked position 122, the barrel slot 120 is aligned with the arm slot 82 so that the barrel 108 does not block the arm slot 82, permitting the hook tab 84 to pass through the arm slot 82 in either direction. When in the locked position 124, the barrel 108 blocks the arm slot 82 so that the tab 84 cannot pass through in either direction, thereby preventing the gate 14 from opening.

Figure 15:
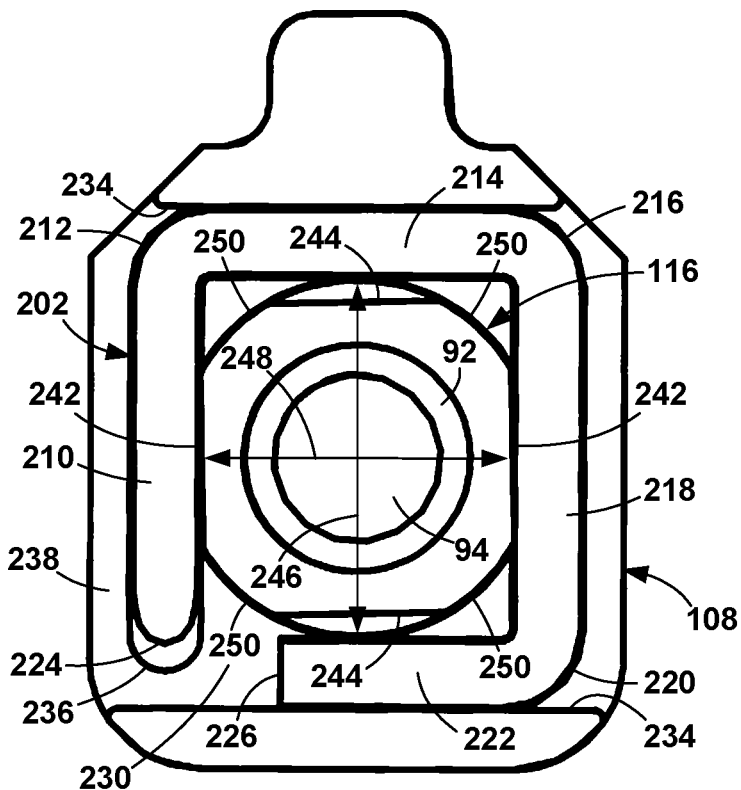
FIG. 15 is a cross-sectional view at the friction ring retaining mechanism with gate lock in the unlocked position.
Figure 16:
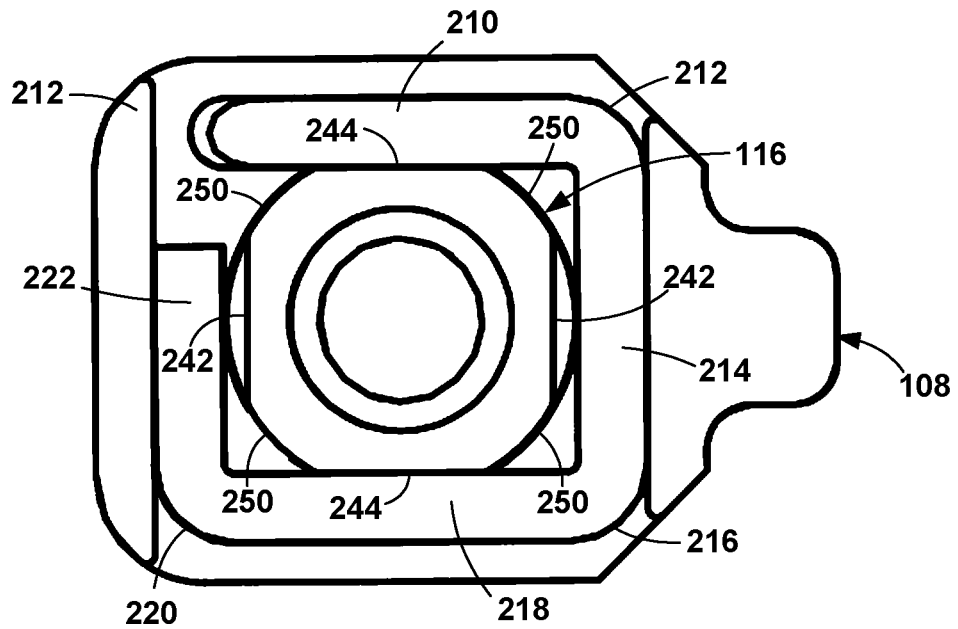
FIG. 16 is a cross-sectional view at the friction ring retaining mechanism with gate lock in the locked position.

In order to retain the barrel 108 in the unlocked or locked position until rotated manually, the present invention employs a retaining mechanism 200. One such retaining mechanism is shown in FIGS. 15 and 16. A ring 202 sits in a lateral depression 204 at the retaining end 206 of the barrel 108. The ring 202 is a length of spring steel formed into a planar rectangle with an open long side 210, a first 90° bend 212, a closed short side 214, a second 90° bend 216, a closed long side 218, a third 90° bend 220, and an open short side 222. The lengths of the long sides and short sides are discussed below. The open long side 212 has a free end 224 with a short finger 228 bent at a 90° angle orthogonal to the plane of the ring 202. The open short side 222 has a free end 226. There is a gap 230 between the open long side free end 224 and the open short side free end 226.

The depression 204 is rectangular and the ring 202 sits in the depression 204 such that the short sides 214, 216 abut the sides 234 of the depression 204. The finger 228 extends into a hole 236 in the floor 236 of the depression 204 in order to maintain the position of the ring 202 in the depression. The ring 204 is retained in the depression 204 by the retainer end 116 of the barrel 108 abutting the arm wall 118 so that the arm wall 118 covers the depression 204.

The ring 202 surrounds the narrow portion 116 of the arm 50, straddling four flat surfaces 242, 244 that are 90° apart. The distance 246 between the short sides 214, 222 is no less than the diameter of the narrow portion 116. The distance 248 between the long sides 210, 218 is the same as the distance between opposed flat surfaces 242, 244 so that the long sides 201, 218 abut the flat surfaces 242, 244. When the gate lock 106 is in the unlocked position 122, the long sides 210, 218 abut the unlocked flat surfaces 242, as in FIG. 15. When the barrel 108 is rotated clockwise in FIG. 15 toward the locked position 124 of FIG. 16, the round perimeter surfaces 250 between the flat surfaces 242, 244 push against the long sides 210, 218, thereby deforming the ring 202. As the barrel 108 continues to rotate, the long sides 210, 218 reach the locked flat surfaces 244, permitting the ring 204 to snap back to its normal shape, with the long sides 210, 218 abutting the locked flat surfaces 244. To unlock the gate lock 106, the barrel 108 is rotated counterclockwise.

Figure 17:
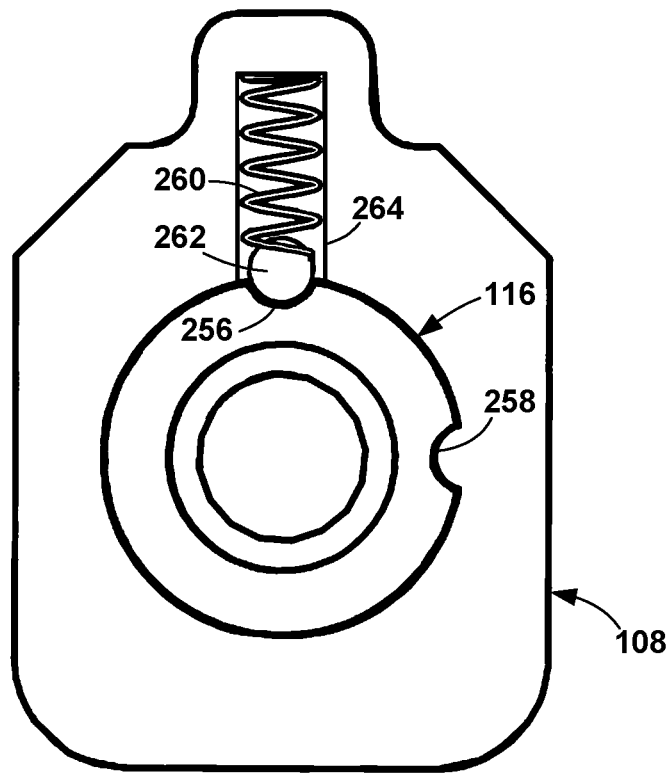
FIG. 17 is a cross-sectional view at the detent retaining mechanism with gate lock in the unlocked position.
Figure 18:
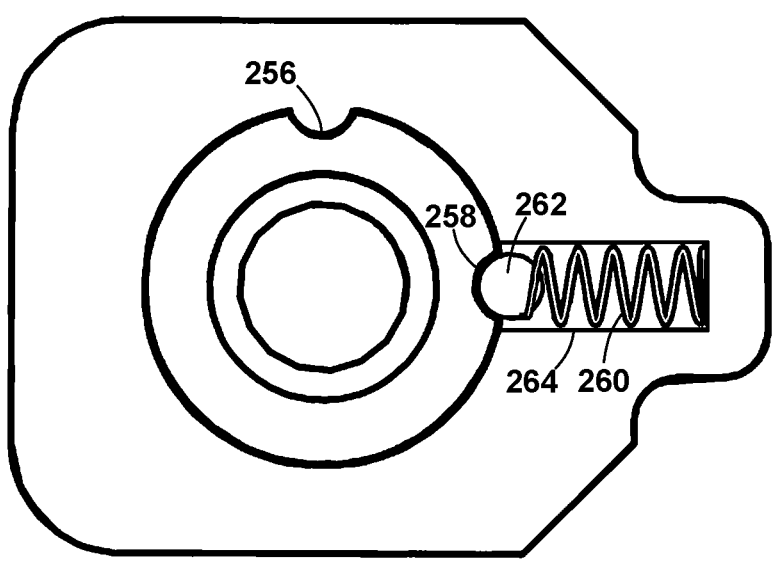
FIG. 18 is a cross-sectional view at the detent retaining mechanism with gate lock in the locked position.

A detent retaining mechanism is shown in FIGS. 17 and 18. The narrow portion 116 of the arm 50 has two rounded depressions, an unlock depression 256 and a lock depression 258 that are 90° apart. A coil spring 260 and steel ball 262 reside in a radial bore 264 in the barrel 108, where the spring 260 pushes the ball 262 against the arm 50. When the barrel 108 is in the lock position 122, as in FIG. 17, the ball 262 is aligned with the unlock depression 256 and the spring 260 pushes the ball 262 into the unlock depression 256, retaining the barrel 108 in the unlock position 122. To rotate the barrel 108 to the lock position 124, enough force must be applied to rotate the barrel 108 to overcome the spring 260 and move the ball 262 from the unlock depression 256. When the barrel 108 is rotated to the lock position 124, as in FIG. 18, the ball 262 is aligned with the lock depression 258 and the spring 260 pushes the ball 262 into the lock depression 258, retaining the barrel 108 in the lock position 124.

The present invention contemplates the use of any other adequate retaining mechanisms.

Figure 19:
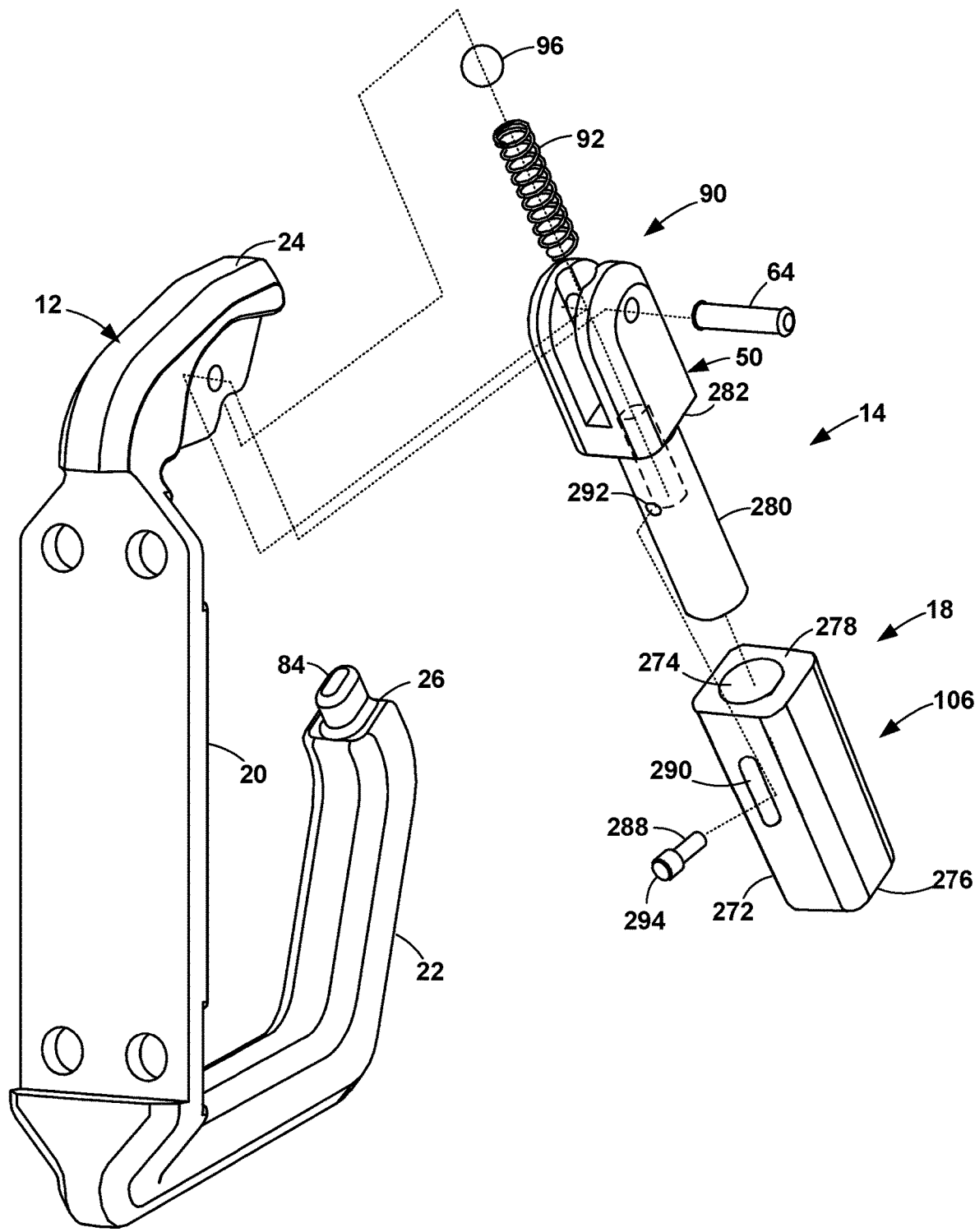
FIG. 19 is an exploded view of the tool holder with one configuration of the optional gate lock.
Figure 20:
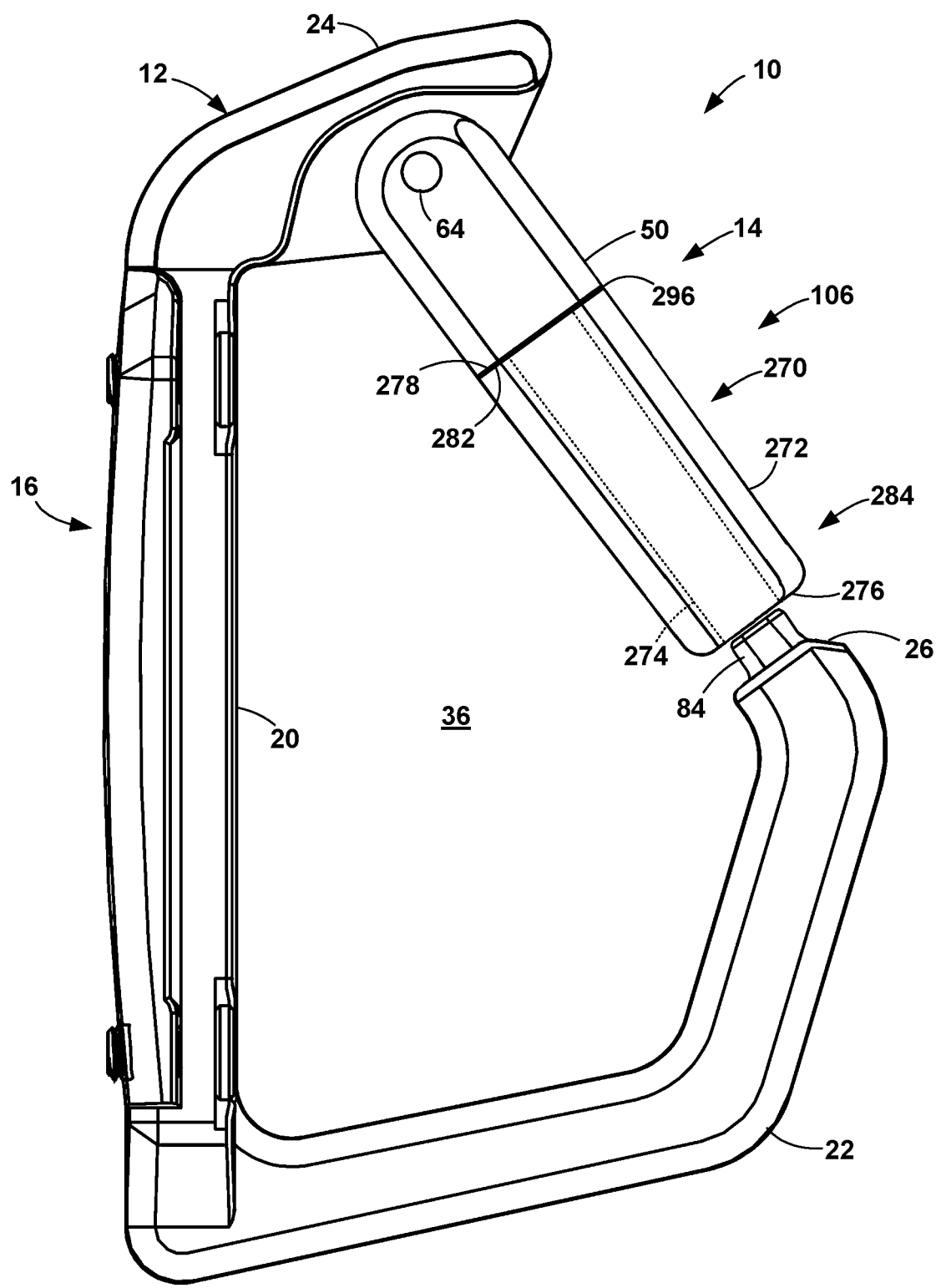
FIG. 20 is a side view of the tool holder in the closed position with the optional gate lock of FIG. 19 in the unlocked position.
Figure 21:
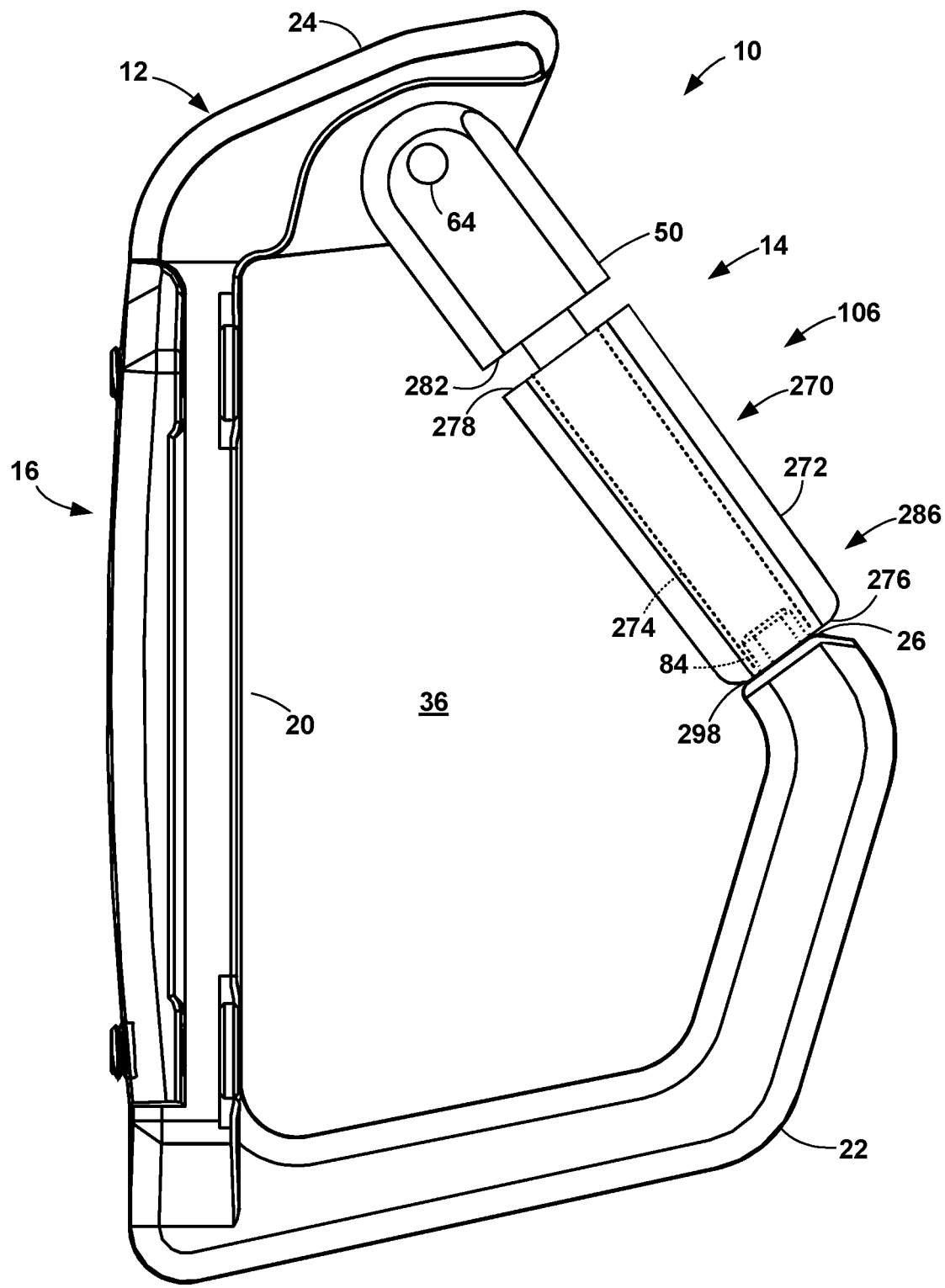
FIG. 21 is a side view of the tool holder in the closed position with the optional gate lock of FIG. 19 in the locked position.

The gate lock configuration 270 of FIGS. 19-21 includes a barrel 272 with an axial bore 274, a butt end 278, and a free end 276. The axial bore 274 fits over a narrow portion 280 of the arm 50 and is mounted to slide up and down the narrow portion 280.

A pin 288 secures the barrel 272 to the arm 50 by extending through an elongated, longitudinal slot 290 in the barrel 272 and being secured in a hole 292 in the arm 50. The pin 288 can be secured by being press-fit into the hole 292, by threads turned into the hole 292, by adhesive, by magnet, or any other adequate means. Optionally, the pin 288 has a head 294 for a tighter fit.

The barrel 272 slides between an unlocked position 284, where the barrel bore 274 does not extend over the hook tab 84 and the gate 14 is free to pivot between the closed position 70, the inside position 72, and the outside position 74, as in FIG. 20, and a locked position 286, where the barrel bore 274 extends over the hook tab 84 and the gate 14 is retained in the closed position 70, as in FIG. 21.

An unlock stop 296 is provided by the barrel butt end 278 abutting the shoulder 282 on the arm 50 at the narrow portion 280. A lock stop 298 is provided by the barrel free end 276 abutting the hook free end 26. The slot 290 is long enough so that both stops 296, 298 can be reached by the barrel 272.

In order to retain the barrel 272 in the unlocked or locked position until slid manually, the present invention employs a retaining mechanism. The present invention contemplates the use of any adequate retaining mechanisms, including friction rings and detents.

The attachment 16 secures the tool holder 10 to the flat webbing 2 of a harness, belt, or the like. The present invention contemplates any mechanism the adequately secures the tool holder 10.

In the illustrated configurations of FIGS. 22-27, the back 20 has a flat outer surface 140. A plate 142 with a flat inner surface 144 removably attaches to the back outer surface 140.

Figure 22:
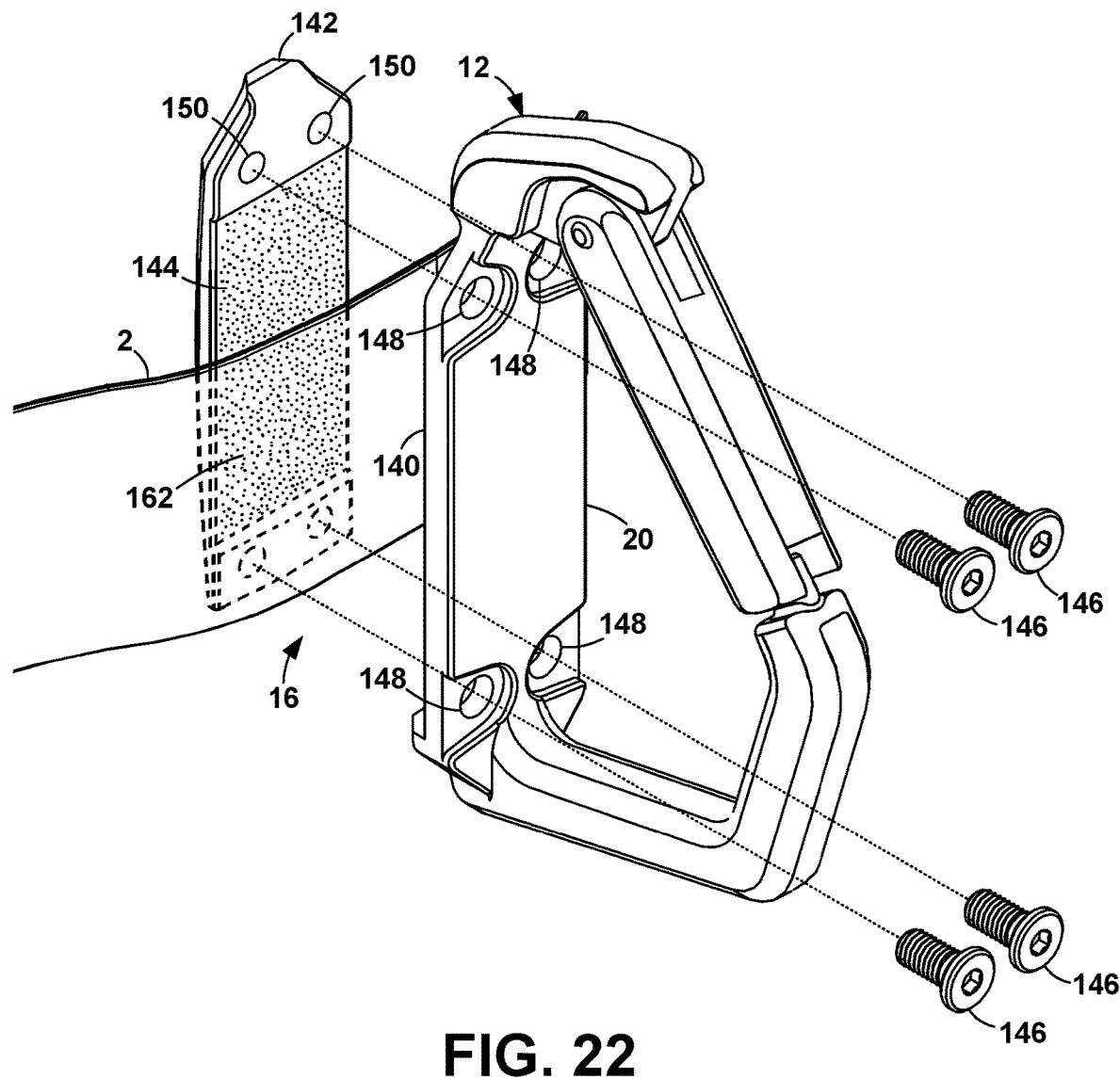
FIG. 22 is an exploded view of one configuration of the tool holder attachment to a webbing.
Figure 23:
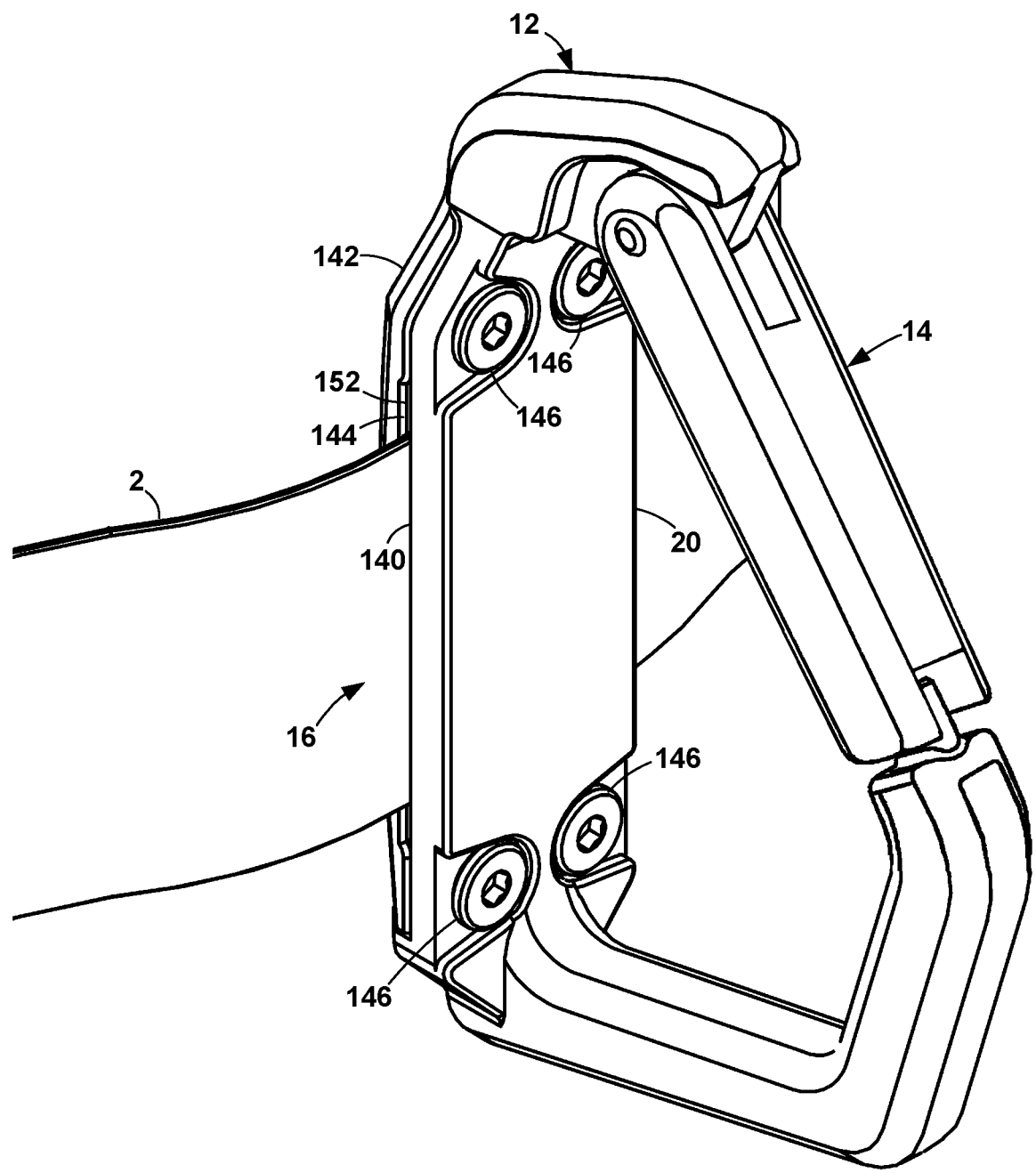
FIG. 23 is a perspective view of the tool holder attachment of FIG. 22 assembled to a webbing.

In the configuration of FIGS. 22 and 23, the plate 142 is attached by removable fasteners, screws 146 in the present illustration, that extend through holes 148 in the four corners of the back 20 and turn into corresponding threaded holes 150 in the plate 142 to secure the plate 142 to the back 20. Alternatively, the screws 146 extend through holes in the four corners of the plate 142 and turn into corresponding threaded holes in the back 20 to secure the plate 142 to the back 20. Alternatively, there are no screws or holes and the plate 142 is attached to the back 20 by magnets.

Figure 24:
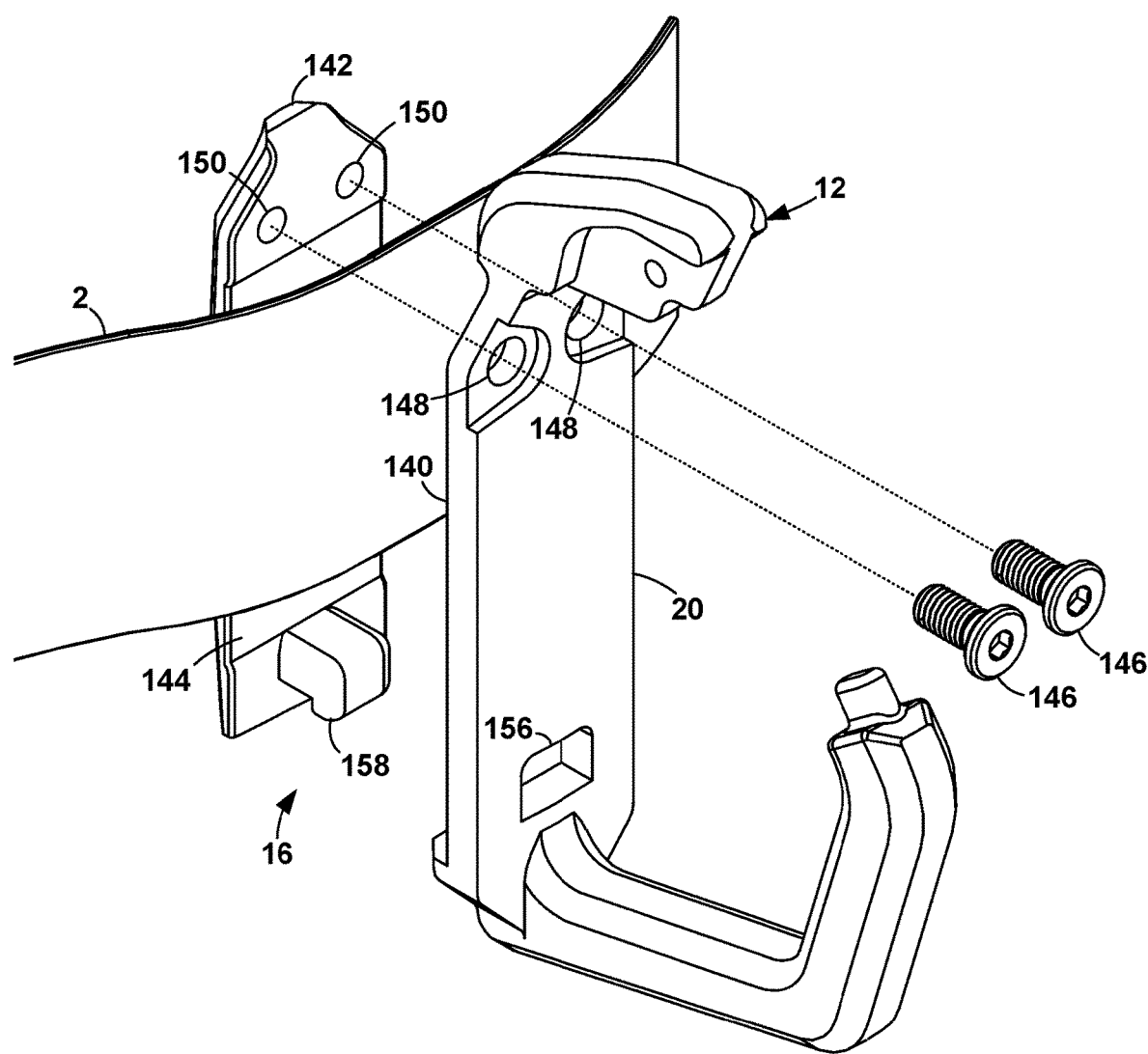
FIG. 24 is an exploded view of another configuration of the tool holder attachment to a webbing.
Figure 25:
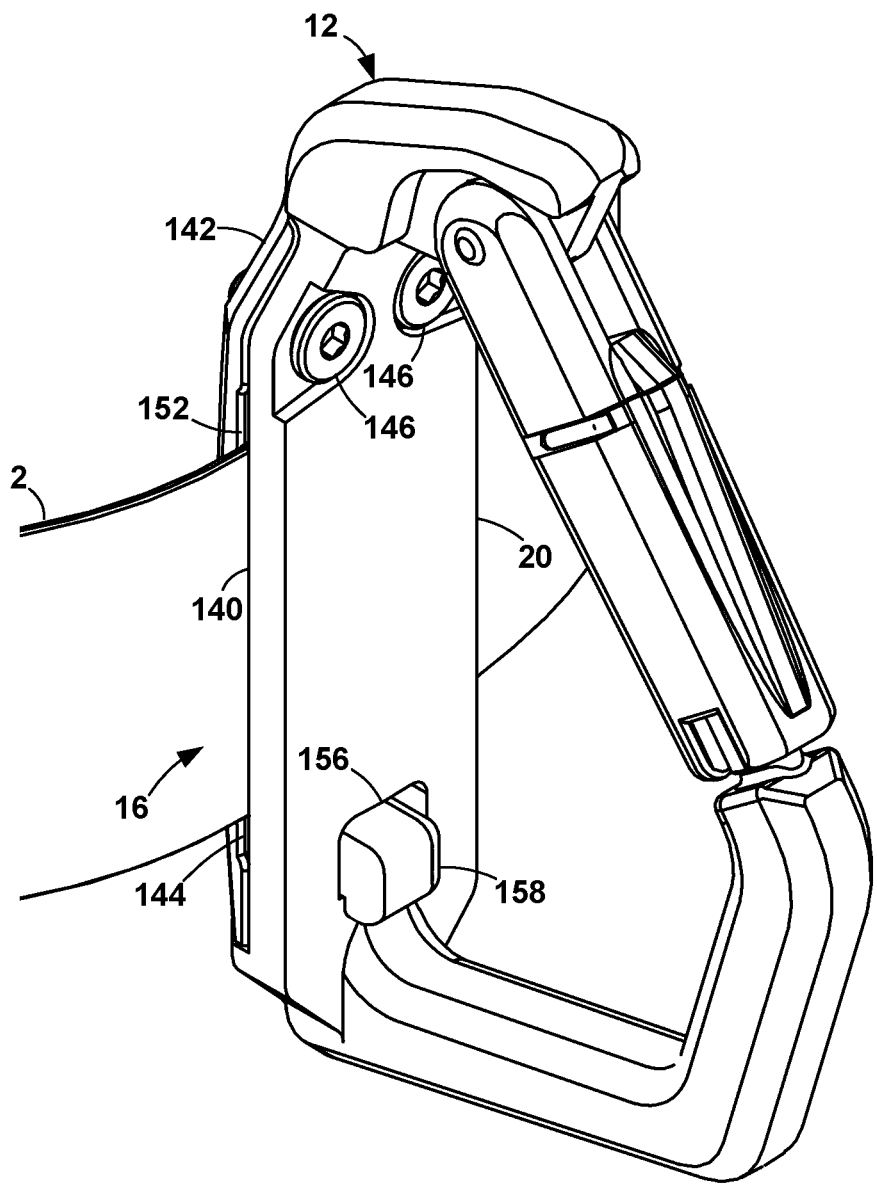
FIG. 25 is a perspective view of the tool holder attachment of FIG. 24 assembled to a webbing.

In the configuration of FIGS. 24 and 25, the plate 142 is attached at one end by a detachable hinge 154, with a lateral, elongated slot 156 in the back outer surface 140 and a lateral, elongated hook 158 at the lower end 160 of the plate 142. The hook 158 hooks into the slot 156. Removable fasteners, screws 146 in the present illustration, extend through holes 148 in the upper corners of the back 20 and turn into corresponding threaded holes 150 in the plate 142 to secure the plate 142 to the back 20. Alternatively, the screws 146 extend through holes in the upper corners of the plate 142 and turn into corresponding threaded holes in the back 20 to secure the plate 142 to the back 20. Alternatively, the attachment is reversed with the hook 158 at the upper end of the plate.

Figure 26:
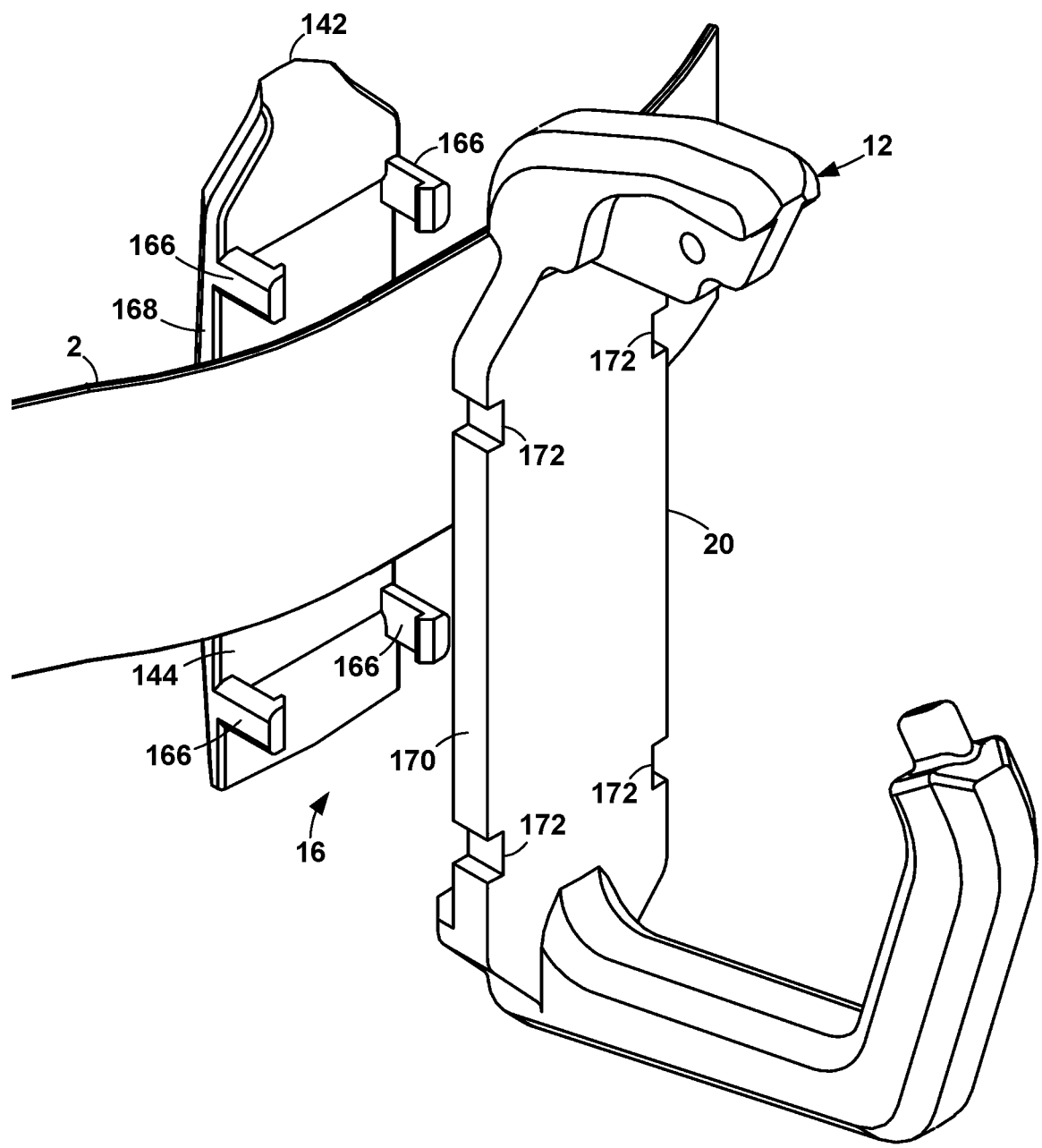
Figure 27:
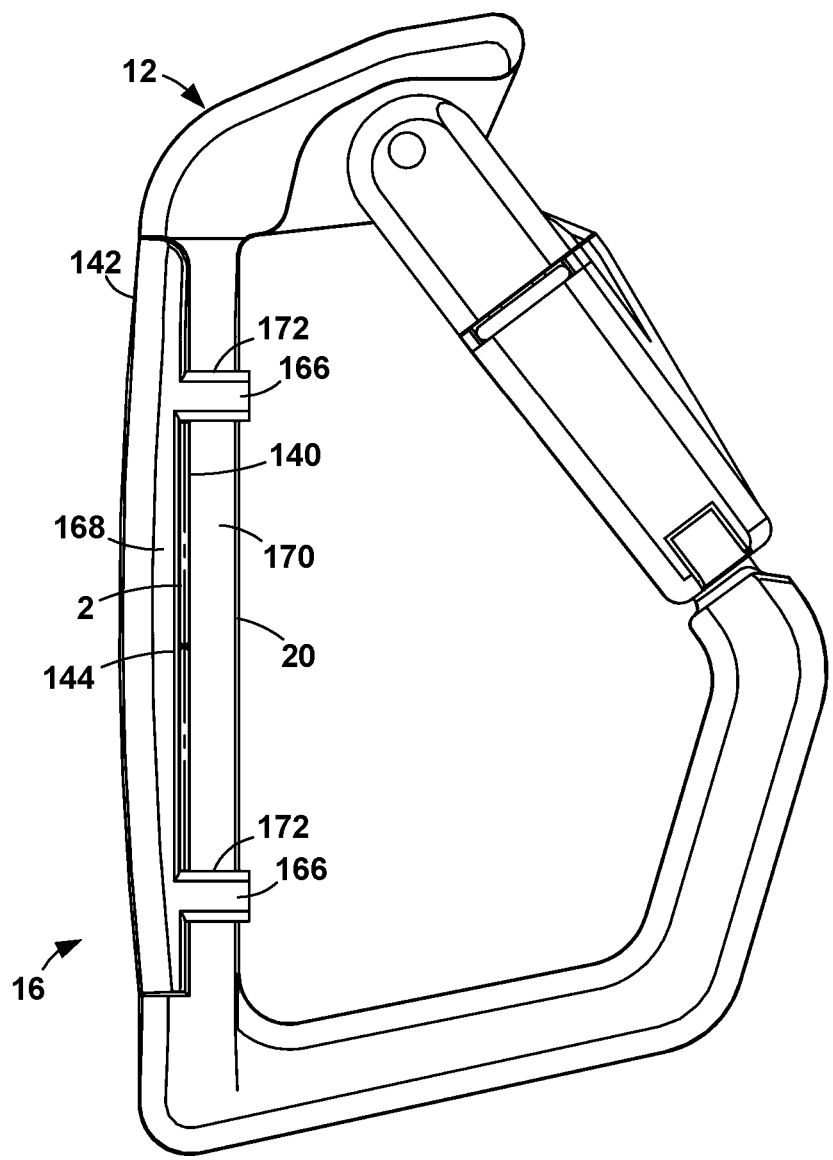
FIG. 27 is a side, cross-sectional view of the tool holder attachment of FIG. 26 assembled to a webbing.

In the configuration of FIGS. 26 and 27, the plate 142 is attached by springs clips 166 at each corner of the plate 142. The clips 166 extend perpendicularly and vertically from the upper and lower sides 168 of the plate 142, and snap onto the side edges 170 of the back outer surface 140. Alternatively, the clips 166 extend perpendicularly and horizontally from the upper and lower edges of the plate 142, and snap onto the upper and lower edges, respectively, of the back outer surface 140. Alternatively, the clips 166 extend from the back outer surface 140 and snap onto the edges of the plate 142. Optionally, the clips 166 snap into notches 172.

When the plate 142 is attached to the back 20, the webbing 2 is sandwiched between the back outer surface 140 and the plate inner surface 144 in a gap 152, as in FIGS. 23, 25, and 27. Optionally, the back outer surface 140 and/or the plate inner surface 144 are textured, as at 174, to help keep the tool holder 10 from sliding around on the webbing 2.

Figure 28:
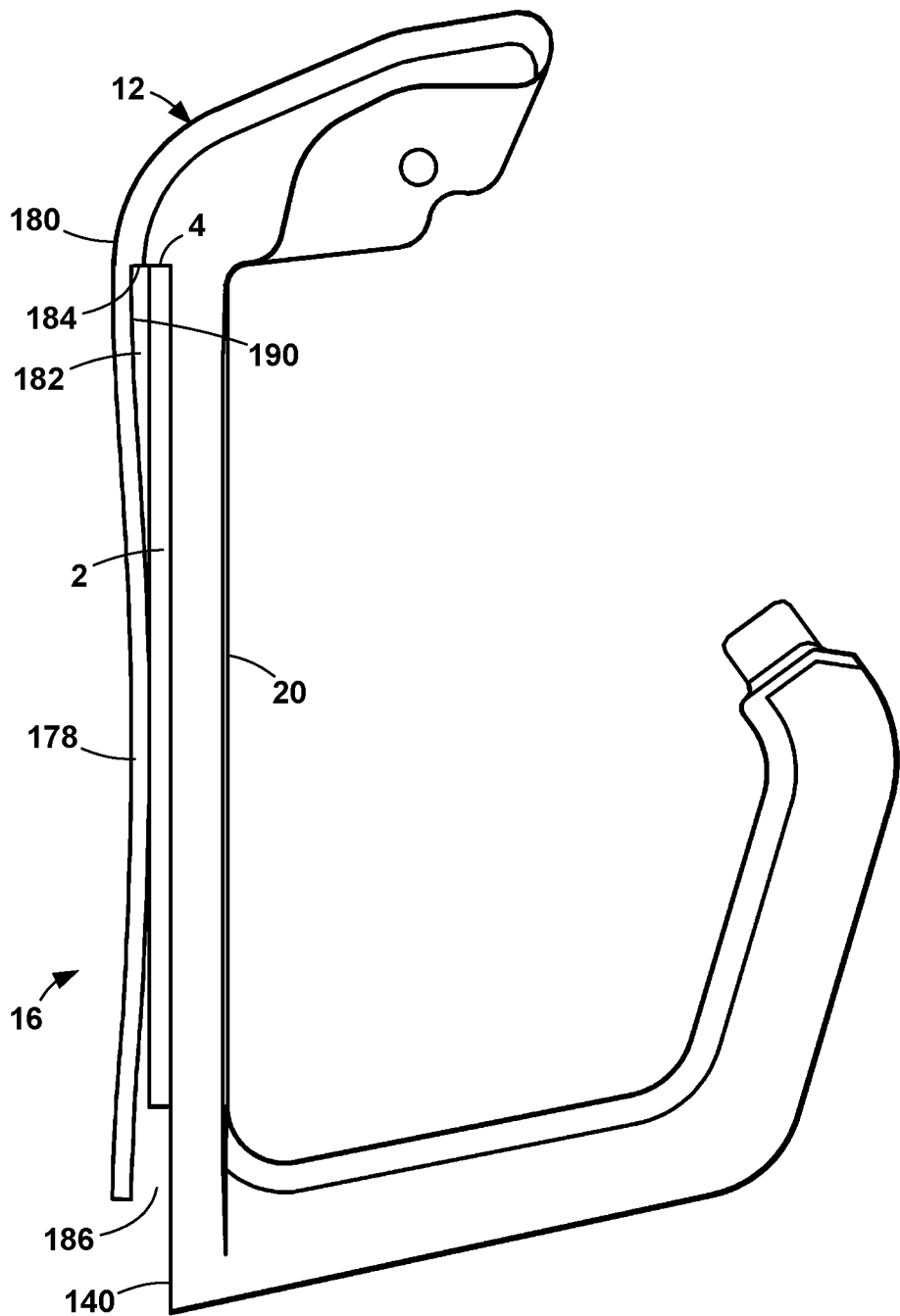
FIG. 28 is a side view of a clip configuration of the tool holder attachment to a webbing.
Figure 29:
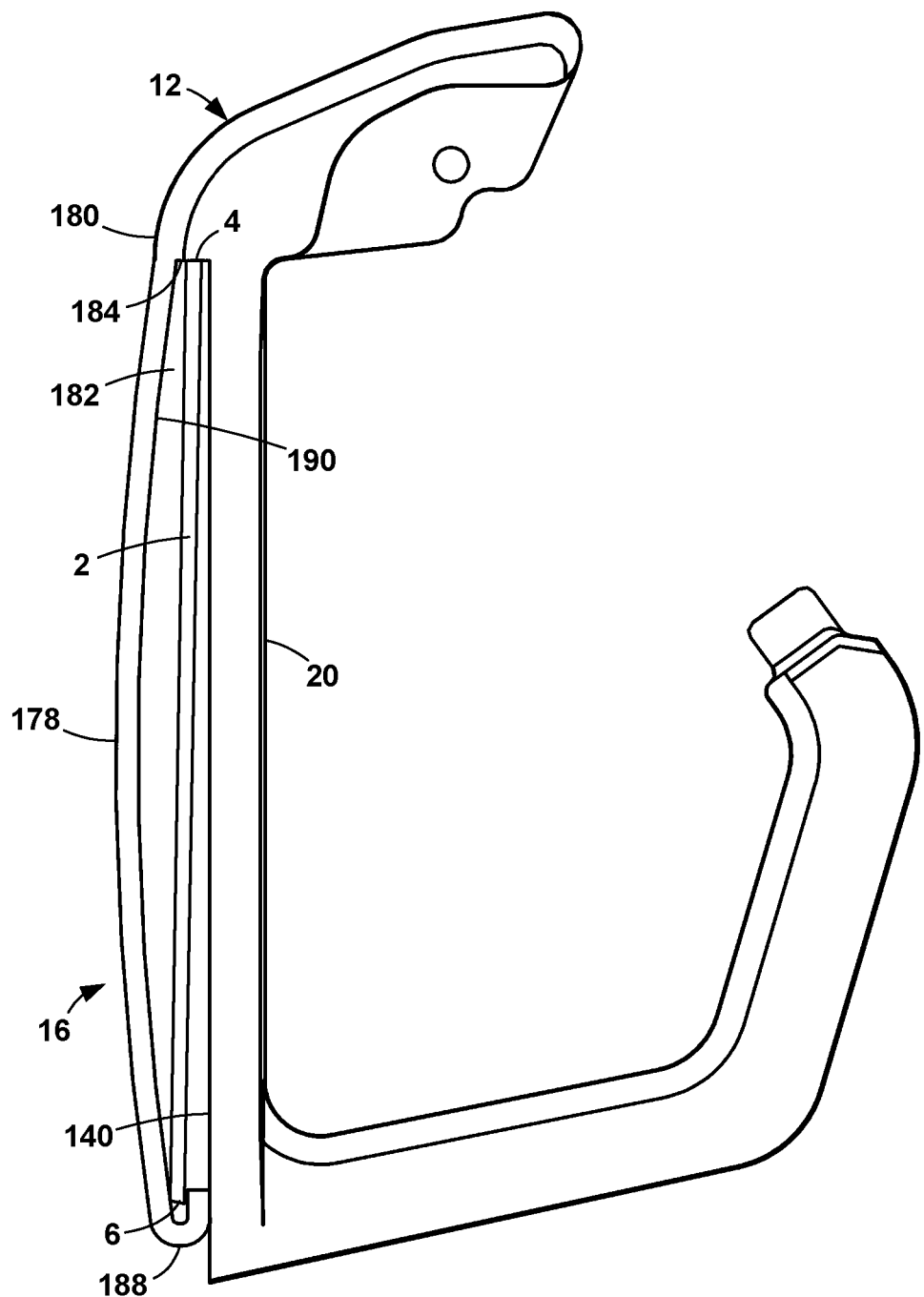
FIG. 29 is a side view of another clip configuration of the tool holder attachment to a webbing.

In the illustrated configurations of FIGS. 28 and 29, a clip 178 extends from the back 20. The clip 178 extends downwardly from the upper portion 180 of the back 20 and forms a gap 182 between the clip 178 and the back outer surface 140. The upper end 184 of the gap 182 is closed and the lower end 186 of the gap 182 is open. In the configuration of FIG. 28, the clip 178 is biased toward the back 20 and therefore squeezes the webbing 2 against the back outer surface 140 to hold the tool holder 10 on the webbing 2. In the configuration of FIG. 29, the clip 178 further hooks around the bottom edge 6 of the webbing 2, as at 188. The closed upper end 184 of the gap 182 and the hook 188 capture the webbing 2 to hold the tool holder 10 in place.

Optionally, the back outer surface 140 and/or plate surface 144/clip inner surface 190 are textured, as at 162 in FIG. 22, to help retain the tool holder 10 in place on the webbing 2.

Thus, it has been shown and described a tool holder. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A tool holder comprising:
   (a) a body with a back having a flat outer surface, a back upper end, a back lower end, a finger extending from the back upper end, and a hook extending from the back lower end, the hook having a free end extending generally toward the finger;
   (b) an opening spanning the finger and the hook free end, the opening providing access to an interior defined by the back, hook, and finger;
   (c) a gate with an elongated arm having a pivot end and a free end, the arm pivot end pivotally attached at the finger to pivot between a closed position wherein the gate spans the opening, an inside position wherein the arm free end is within the interior, and an outside position wherein the arm free end is outside of the interior and opening, the gate being biased to the closed position; and
   (d) an attachment mechanism adapted for attaching the back to a webbing.

2. The tool holder of claim 1 wherein the gate is biased to the closed position by a biasing mechanism comprising a coil spring in an axial bore in the pivot end of the gate arm and a steel ball between the coil spring and a finger notch in the finger, whereby, when pressure is applied to move the gate to the inside position or outside position, the steel ball moves away from the finger notch, compressing the spring, and when the pressure is removed, the spring pushes the steel ball back to the finger notch and the gate to the closed position.

3. The tool holder of claim 1 further comprising a gate lock having an unlocked position wherein the gate is permitted to move between the inside position, closed position, and outside position, and a locked position wherein the gate is prevented from moving from the closed position.

4. The tool holder of claim 1 wherein the arm free end and the hook free end interlock when the gate is in the closed position.

5. The tool holder of claim 4 wherein the interlock is comprised of a tab extending from the hook free end and a radial arm notch in the arm free end, whereby the tab resides in the arm notch when the gate is in the closed position and the tab slides out of the arm notch when the gate moves to the inside position or the outside position.

6. The tool holder of claim 5 further comprising a gate lock comprised of a barrel mounted to rotate about the arm, the barrel having a barrel free end generally aligned with the arm free end and having a radial barrel notch, the barrel rotating between an unlocked position wherein the barrel notch is aligned with the arm notch, and a locked position wherein the barrel notch is not aligned with the arm notch.

7. The tool holder of claim 6 further comprising a pin extending through an elongated circumferential slot in the barrel and secured into a hole in the arm, the pin retaining the barrel on the arm and providing rotational stops for the unlocked position and the locked position.

8. The tool holder of claim 6 further comprising a retention mechanism for retaining the barrel in the unlocked position and the unlocked position.

9. The tool holder of claim 1 further comprising an attachment ring on the hook.

10. The tool holder of claim 1 wherein the attachment mechanism comprises a plate with a flat inner surface removably mounted to the outer surface of the back whereby the webbing is sandwiched between the outer surface of the back and the inner surface of the plate.

11. The tool holder of claim 10 wherein one or both of the outer surface and the inner surface are textured.

12. The tool holder of claim 10 wherein the plate is removably attached to the back by screws.

13. A tool holder comprising:
   (a) a body with a back having a flat outer surface, a back upper end, a back lower end, a finger extending from the back upper end, and a hook extending from the back lower end, the hook having a free end extending generally toward the finger;
   (b) an opening spanning the finger and the hook free end, the opening providing access to an interior defined by the back, hook, and finger;

(c) a gate with an elongated arm having a pivot end and a free end, the arm pivot end pivotally attached at the finger to pivot between a closed position wherein the gate spans the opening and the arm free end and the hook free end interlock, an inside position wherein the arm free end is within the interior, and an outside position wherein the arm free end is outside of the interior and opening, the gate being biased to the closed position;

(d) a gate lock having an unlocked position wherein the gate is permitted to move between the inside position, closed position, and outside position, and a locked position wherein the gate is prevented from moving from the closed position; and (e) an attachment mechanism adapted for attaching the back to a webbing having a plate with a flat inner surface removably mounted to the outer surface of the back whereby the webbing is sandwiched between the outer surface of the back and the inner surface of the plate.

14. The tool holder of claim 13 wherein the gate is biased to the closed position by a biasing mechanism comprising a coil spring in an axial bore in the pivot end of the gate arm and a steel ball between the coil spring and a finger notch in the finger, whereby, when pressure is applied to move the gate to the inside position or outside position, the steel ball moves away from the finger notch, compressing the spring, and when the pressure is removed, the spring pushes the steel ball back to the finger notch and the gate to the closed position.

15. The tool holder of claim 13 wherein the interlock is comprised of a tab extending from the hook free end and a radial arm notch in the arm free end, whereby the tab resides in the arm notch when the gate is in the closed position and the tab slides out of the arm notch when the gate moves to the inside position or the outside position.

16. The tool holder of claim 15 wherein the gate lock includes a barrel mounted to rotate about the arm and a pin extending through an elongated circumferential slot in the barrel and secured into a hole in the arm, the barrel having a barrel free end generally aligned with the arm free end and having a radial barrel notch, the barrel rotating between an unlocked position wherein the barrel notch is aligned with the arm notch, and a locked position wherein the barrel notch is not aligned with the arm notch, the pin retaining the barrel on the arm and providing rotational stops for the unlocked position and the locked position.

17. The tool holder of claim 16 further comprising a retention mechanism for retaining the barrel in the unlocked position and the unlocked position.

18. The tool holder of claim 13 further comprising an attachment ring on the hook.

19. The tool holder of claim 13 wherein one or both of the outer surface and the inner surface are textured.

20. The tool holder of claim 13 wherein the plate is removably attached to the back by screws.

* * * * *